(12) United States Patent
Matsumoto

(10) Patent No.: US 9,413,921 B2
(45) Date of Patent: Aug. 9, 2016

(54) IMAGING APPARATUS AND CONTROL METHOD THEREOF

(71) Applicant: CANON KABUSHIKI KAISHA, Tokyo (JP)

(72) Inventor: Kiyonori Matsumoto, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/645,962

(22) Filed: Mar. 12, 2015

(65) Prior Publication Data

US 2015/0271355 A1 Sep. 24, 2015

(30) Foreign Application Priority Data

Mar. 18, 2014 (JP) ................................. 2014-055619

(51) Int. Cl.
| | | |
|---|---|---|
| *H04N 5/228* | (2006.01) | |
| *H04N 9/73* | (2006.01) | |
| *H04N 1/21* | (2006.01) | |
| *H04N 5/232* | (2006.01) | |

(52) U.S. Cl.
CPC ............. *H04N 1/2112* (2013.01); *H04N 1/215* (2013.01); *H04N 5/23245* (2013.01)

(58) Field of Classification Search
CPC ..... H04N 9/735; H04N 1/6077; H04N 1/608; H04N 13/0025; H04N 1/6086; G09G 2320/0666; G01J 1/4204
USPC .......................................... 348/222.1–225.1
See application file for complete search history.

(56) References Cited

U.S. PATENT DOCUMENTS

| | | | |
|---|---|---|---|
| 7,768,553 B2 | 8/2010 | Kamiya | |
| 8,417,067 B2 | 4/2013 | Nakao et al. | |
| 8,976,268 B2* | 3/2015 | Hattori | H04N 5/2351 348/234 |
| 2006/0152609 A1* | 7/2006 | Prentice | G06T 1/0007 348/272 |
| 2007/0165960 A1* | 7/2007 | Yamada | H04N 9/735 382/254 |
| 2009/0022421 A1* | 1/2009 | Uyttendaele | G06T 3/4038 382/284 |
| 2009/0160969 A1* | 6/2009 | Kuroiwa | H04N 5/23293 348/223.1 |
| 2010/0231603 A1* | 9/2010 | Kang | G09G 3/3426 345/591 |

FOREIGN PATENT DOCUMENTS

JP 2011-244423 A 12/2011

OTHER PUBLICATIONS

U.S. Office Action issued in corresponding U.S. Appl. No. 14/659,719 on Jun. 24, 2016.

* cited by examiner

*Primary Examiner* — Chia-Wei A Chen
(74) *Attorney, Agent, or Firm* — Carter, DeLuca, Farrell & Schmidt, LLP

(57) ABSTRACT

During capturing, image data obtained by applying a simplified development process to RAW image data is recorded together with a RAW image. Afterward, image data obtained by applying a high quality development process to the RAW image data is generated, and this image data replaces the image data obtained by the simplified development. During capturing, a plurality of pieces of image data are generated by using a plurality of different development parameters for RAW image data, and recorded in association with the RAW image data. The development parameter corresponding to image data selected by the user is decided as a development parameter used for the subsequent high quality development process for the RAW image data, thereby facilitating the setting of the development parameters of the RAW image.

11 Claims, 11 Drawing Sheets

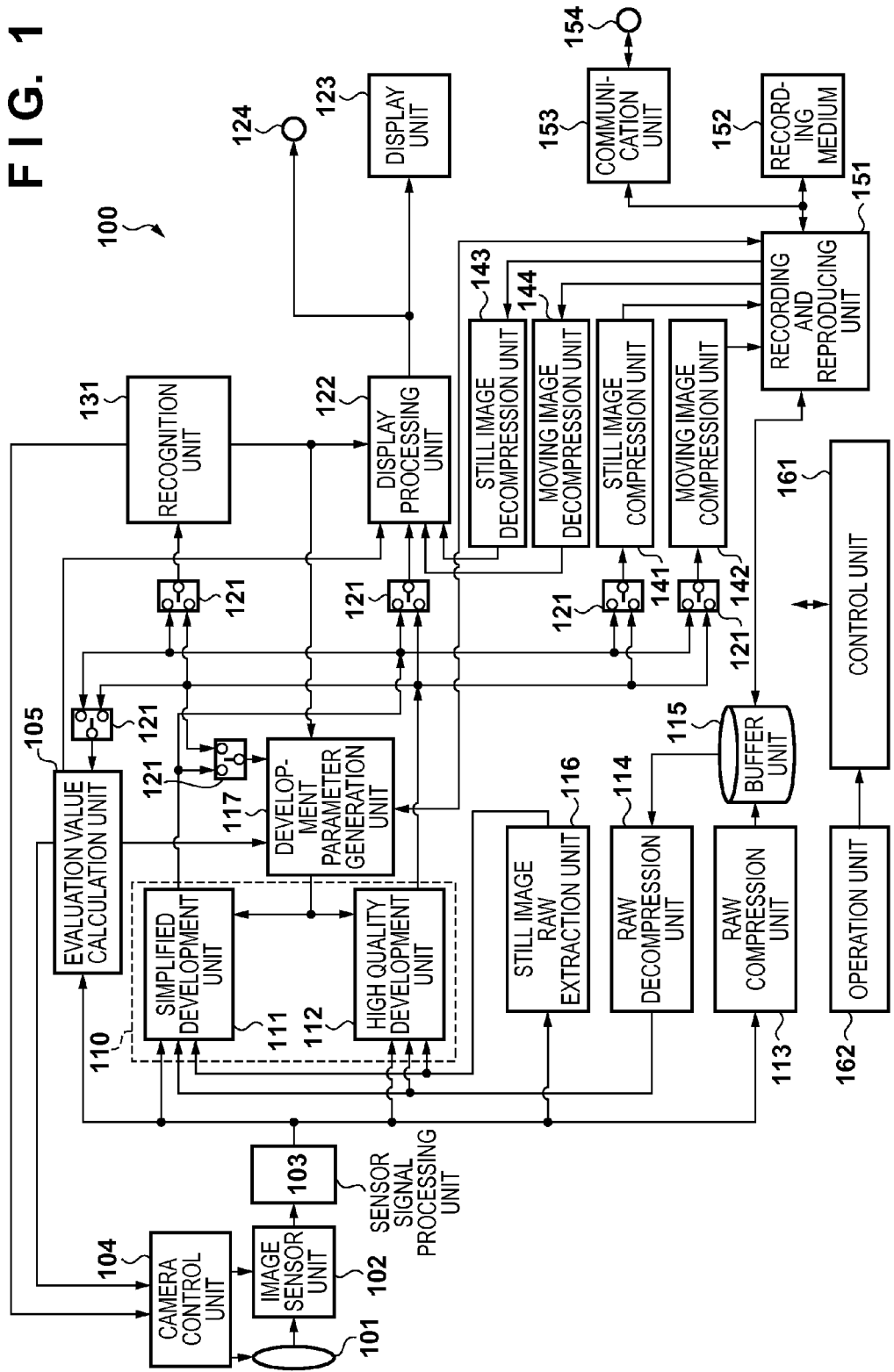

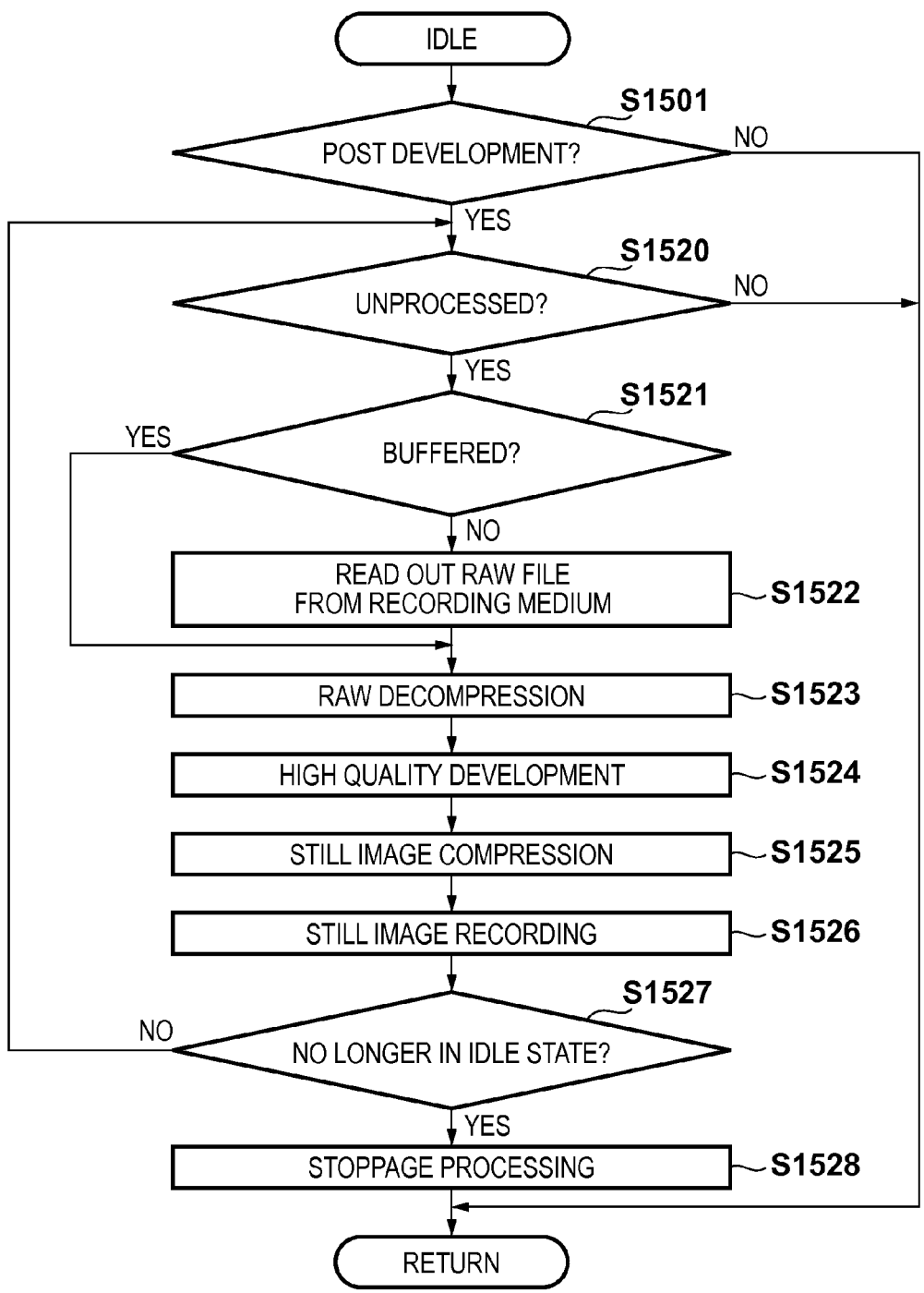

IMAGING APPARATUS AND CONTROL METHOD THEREOF

BACKGROUND OF THE INVENTION

1. Field of the Invention

The present invention relates to an imaging apparatus and a control method thereof, and particularly to a technique for handling a RAW image of a moving image or a still image.

2. Description of the Related Art

Conventionally, an imaging apparatus using an image sensor generally applies the so-called development process to image information (RAW image) obtained by an image sensor, and performs compression encoding on the developed luminance signal and color difference signal, and records the encoded signals in a JPEG format in a recording medium. The development process includes, but is not limited to demosaicing for performing color interpolation on each pixel to generate a signal composed of a luminance and a color difference, noise reduction on the signal, white balancing, optical distortion correction, and image optimization processing.

Meanwhile, there are imaging apparatuses capable of recording RAW images (Japanese Patent Laid-Open No. 2011-244423). As compared with JPEG format or the like, a RAW image requires an enormous amount of data for recording, but is advantageous in that it allows flexible post editing, while minimizing deterioration in image quality. In addition, Japanese Patent Laid-Open No. 2011-244423 describes that development parameters for use in a development process of a RAW image are recorded together with the RAW image.

Due to recent advancements of image sensors, the number of pixels per image has been significantly increased. Consequently, the throughput necessary for the development process of the RAW image has also been increased, and hardware having high processing capability is required in order to achieve a real-time development process in parallel with capturing. In general, at least one of the circuit scale and the power consumption of hardware having high processing capability tends to increase, but restrictions in terms of, for example, an implementable area, power consumption, and costs, are imposed on implementable hardware. As a result, there may be a case where the capability (e.g., continuous shooting capability) of the imaging apparatus depends on the development processing capability.

When a configuration in which a RAW image is recorded without being developed is adopted, whether the development process can be applied in real time would not be a problem. However, the amount of data recorded is increased, and it may thus be necessary to increase the buffer amount. Additionally, although the development process is necessary to check a result of capturing, the data format of the RAW image is unique to each manufacturer. Accordingly, an appropriate development process may not be able to be applied by an apparatus different from the imaging apparatus that has performed capturing, and there is the risk of impairing user convenience.

As such, in order for high capturing capacity and high-speed reproduction of captured images to be achieved, it has been necessary to enable a high cost and high power consumption circuit having high processing capability to be installed and driven at high output, or to enable a recorded RAW image to be reproduced at high speed.

In addition, by recording RAW images, the user can set various development parameters and apply the development process at a later time. However, it is not necessarily easy for a general user to set development parameters for obtaining the desired development result.

SUMMARY OF THE INVENTION

The present invention has been made in order to improve at least one of such problems in the conventional techniques. The present invention facilitates the setting of development parameters for RAW images in an image processing apparatus capable of recording a RAW image without the need of a circuit for applying a high-speed development process and in such a manner that the RAW image can be easily reproduced when necessary, and a control method thereof.

According to an aspect of the present invention, there is provided an imaging apparatus comprising: an imaging unit configured to generate RAW image data representing an undeveloped image which is captured by an image sensor in response to a capturing instruction; a development unit configured to generate image data by applying, to the RAW image data, a first development process or a second development process that can provide an image having higher image quality than that obtained by the first development process; a recording unit configured to read and write data from and to a recording medium; and a control unit configured to control the recording unit so as to write, to the recording medium, the RAW image data and first image data obtained by applying the first development process to the RAW image data, and thereafter control the development unit and the recording unit so as to generate second image data by applying the second development process to the RAW image data written to the recording medium and write the second image data to the recording medium, wherein the control unit is further configured to: control the development unit so as to generate a plurality of pieces of third image data from the RAW image data by using a plurality of different development parameters; and decide, from among the plurality of pieces of third image data, a development parameter corresponding to image data selected by a user as a development parameter used in a development process for the RAW image data that is applied after the RAW image data has been written to the recording medium.

According to another aspect of the present invention, there is provided a control method of an imaging apparatus including: an imaging unit configured to generate RAW image data representing an undeveloped image which is captured by an image sensor in response to a capturing instruction; a development unit configured to generate image data by applying, to the RAW image data, a first development process or a second development process that can provide an image having higher image quality than that obtained by the first development process; and a recording unit configured to read and write data from and to a recording medium, the method comprising the steps of: controlling the recording unit so as to write, to the recording medium, the RAW image data and first image data obtained by applying the first development process to the RAW image data; controlling the development unit and the recording unit so as to generate second image data by applying the second development process to the RAW image data written to the recording medium and write the second image data to the recording medium; controlling the development unit so as to generate a plurality of pieces of third image data from the RAW image data by using a plurality of different development parameters; and deciding, from among the plurality of pieces of third image data, a development parameter corresponding to image data selected by a user as a development parameter used in a development process for the RAW image data that is applied after the RAW image data has been written to the recording medium.

Further features of the present invention will become apparent from the following description of exemplary embodiments with reference to the attached drawings.

BRIEF DESCRIPTION OF THE DRAWINGS

FIG. 1 is a block diagram showing an exemplary configuration of an imaging apparatus according to an embodiment of the present invention.

FIG. 10 is a flowchart illustrating operations in an idle state of the imaging apparatus according to an embodiment.

DESCRIPTION OF THE EMBODIMENTS

Figure 2A:
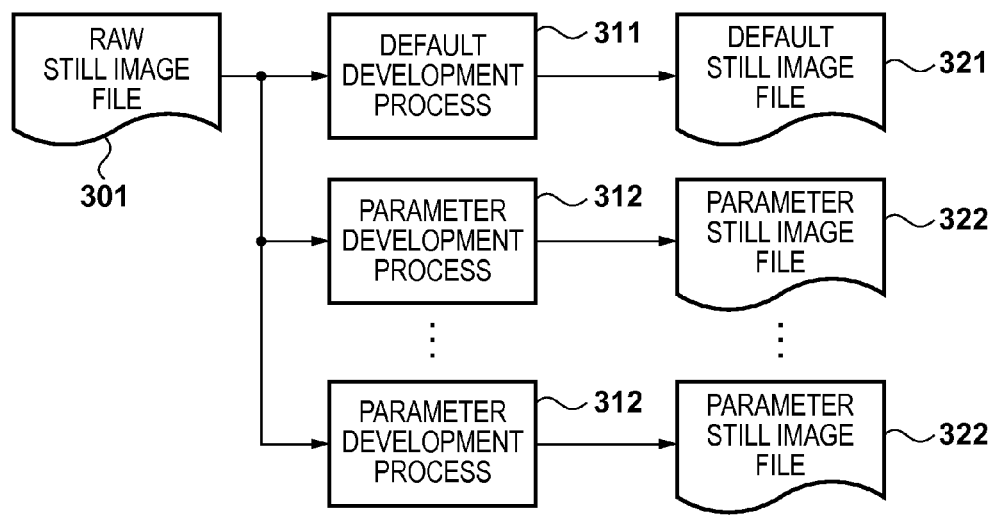
FIGS. 2A and 2B are diagrams schematically showing an overview of operations in a parameter still image capturing mode and a parameter moving image capturing mode of an imaging apparatus according to an embodiment.

Exemplary embodiments of the present invention will now be described in detail in accordance with the accompanying drawings.

FIG. 1 is a block diagram showing an exemplary functional configuration of an imaging apparatus as an example of an image processing apparatus according to an embodiment of the present invention. These functional blocks may be implemented by dedicated hardware such as ASIC, or may be implemented through software by a general-purpose processor such as an MPU executing a program.

An imaging apparatus 100 shown in FIG. 1 has not only the function of recording image data obtained by imaging a subject image in a recording medium, but also the function of reproducing the image data from the recording medium, and developing and displaying the image data, and the function of sending and receiving the image data to and from an external apparatus, a server (cloud) or the like. Therefore, the imaging apparatus according to the embodiment of the present invention can be represented as an image processing apparatus, a recording apparatus, a reproducing apparatus, a recording and reproducing apparatus, a communication apparatus, or the like.

Referring to FIG. 1, a control unit 161 includes a programmable processor such as a CPU or an MPU and a non-volatile memory storing a control program executed by the programmable processor, and controls the overall processing of the imaging apparatus 100. Note that a signal line for performing control and communication is connected from the control unit 161 to each of the various functional blocks although only a part thereof is shown in FIG. 1 in order to avoid the complexity of illustration. An operation unit 162 includes an input device, such as a key, a button, or a touch panel, that is used by the user to provide an instruction to the imaging apparatus 100. An operation signal from the operation unit 162 is detected by the control unit 161, and the control unit 161 controls other functional blocks or the like such that an operation in accordance with the detected operation is performed. A display unit 123 displays an image that is provided through a display processing unit 122, including, for example, an image captured or reproduced by the imaging apparatus 100, a menu screen, a various types of information, and the like. The display unit 123 includes, for example, a Liquid Crystal Display (LCD) or the like.

A subject image that is to be imaged is imaged on an image sensor unit 102 via an imaging optical unit 101. In response to a capturing start instruction provided by the operation unit 162, the control unit 161 starts capturing and recording operations. Note that it is possible to adopt a configuration in which moving image capturing is performed in order to achieve a live-view display during standby for capturing. The operations of the imaging optical unit 101 and the image sensor unit 102 are controlled by the control unit 161 on the basis of results of calculating evaluation values, including, for example, an aperture, focus, camera shake, and the like obtained by an evaluation value calculation unit 105, and subject information from a recognition unit 131.

The image sensor unit 102 may be, for example, a CCD image sensor or CMOS image sensor that converts light transmitted through a color filter of red, green, and blue (RGB) disposed for each pixel into an electric signal. For example, the image sensor unit 102 of the present embodiment has the capability of outputting image data for 8000 pixels wide× 4000 pixels high at 60 frames per second. Note that the colors and pattern constituting the color filter may be those of, for example, the primary color Bayer pattern, and it is possible to adopt any other pattern.

The electric signal converted by the image sensor unit 102 is subjected to a pixel correction process by a sensor signal processing unit 103. The correction process includes processing of interpolating pixels to be corrected by using the values of surrounding pixels or processing of subtracting a predetermined offset value for the values of missing pixels or pixels with low reliability in the image sensor unit 102. In the present embodiment, image data that is output from the sensor signal processing unit 103 is referred to as RAW image data, which means an image that has not been developed. Note that the bit length compression of the image data may be performed within the sensor signal processing unit 103 by using an encoding technique such as differential pulse-code modulation (DPCM). This is more effective since the occupied amount of the bus band during data transmission is reduced. In that case, the image data compressed in the sensor signal processing unit 103 and the restored image data thereof are also handled in the category of the above-described RAW image data.

The RAW image data output from the sensor signal processing unit 103 is developed by a development unit 110. The development unit 110 includes a plurality of (in the present embodiment, two) different development processing units, which have different levels of the processing precision and different priorities of the processing load. In the present embodiment, the development unit 110 is composed of a simplified development unit 111 that applies a first development process and a high quality development unit 112 that applies a second development process. The simplified development unit 111 and the high quality development unit 112 both apply, to the RAW image data, a development process such as debayering (also called demosaicing or color interpolation), white balance adjustment, RGB to YUV conversion, noise reduction, and optical distortion correction. Note that these are examples of the processing included in the development process, and it is not intended to mean that all of them are essential for the development process. Other processing may also be included or a part of the above-mentioned processing may not be included in the development process.

The high quality development unit 112 performs various types of processing with higher precision than the simplified development unit 111. Due to the higher precision, the high quality development unit 112 provides a developed image having higher image quality than that can be obtained by the simplified development unit 111, but requires a large processing load at the same time. On the other hand, the simplified development unit 111 reduces the number of pixels on one screen of the RAW image data to 2000 pixels wide×1000 pixels high, for example. Furthermore, due to the lower processing precision than that of the high quality development unit 112, the simplified development unit 111 can apply the development process at high speed during capturing, although the obtained image quality is lower than that obtained by the high quality development unit 112. In this way, the simplified development unit 111 is configured to process image data having a smaller number of pixels than that of the RAW image data, and also to perform the processing in a simplified manner, thus reducing the throughput. Since the processing load of the simplified development unit 111 is small, the simplified development unit 111 is used for real-time development performed in parallel with a capturing operation. A switch unit 121 is switched by the control unit 161 in accordance with the operation content instructed through the operation unit 162 by the user or the control corresponding to the operating mode being executed, and supplies the output of one of the simplified development unit 111 and the high quality development unit 112 to a downstream block.

Although the present embodiment illustrates a configuration in which the simplified development unit 111 and the high quality development unit 112 exist independently within the development unit 110, it is possible to adopt a configuration in which a single development unit switches the operating modes so as to perform the simplified development and the high quality development exclusively. Further, it is sufficient that the plurality of development units have processing loads that are different from one another, and it is not essential to lower both the size of the image to be processed and the processing precision. For example, the plurality of development units may include development units having the same number of pixels to be processed, but different levels of processing precision, or development units having the same level of processing precision, but different numbers of pixels to be processed. However, the plurality of development units need to include at least one development unit capable of completing the development process of the captured image until the start of capturing the next image.

Although FIG. 1 shows the RAW image data from the sensor signal processing unit 103 as being input to the simplified development unit 111 and the high quality development unit 112 within the development unit 110, this does not mean that the development process for the same RAW image data is applied by both of the development units. In terms of the processing load, basically, only a single development unit executes the development process. Accordingly, a switch unit 121 such as one that switches the development unit to which the RAW image data is input may be further provided.

The image data developed by the development unit 110 is subjected to predetermined processing performed by the display processing unit 122, and is thereafter displayed in the display unit 123. Alternatively, the developed image data may be output through a video output terminal 124 to a display device connected outside. The video output terminal 124 includes, for example, a general-purpose interface such as HDMI (registered trademark) or SDI.

The image data developed by the development unit 110 is also supplied to the evaluation value calculation unit 105. The evaluation value calculation unit 105 calculates, from the image data, evaluation values such as a state of focus and a state of exposure, for example. These evaluation values are used, for example, for auto focus detection and auto exposure control performed by the control unit 161.

The image data developed by the development unit 110 is also supplied to the recognition unit 131. The recognition unit 131 has the function of detecting and recognizing subject information contained in the image data. For example, the recognition unit 131 detects a person's face contained in the image represented by the image data, and outputs information indicating the position and the size of the face if the face is detected. The recognition unit 131 may also perform, for example, authentication of a specific person based on feature information such as the face.

The image data developed by the development unit 110 is also supplied to a still image compression unit 141 and a moving image compression unit 142. The still image compression unit 141 is used in the case of compressing the image data as a still image. The still image compression unit 141 encodes still image data in accordance with a known encoding scheme such as JPEG. The moving image compression unit 142 is used in the case of compressing the image data as a moving image. The moving image compression unit 142 encodes moving image data in accordance with a known encoding scheme such as H.264 or H.265. Each of the still image compression unit 141 and the moving image compression unit 142 performs high-efficiency encoding (compression encoding) on the target image data to generate image data whose information amount has been compressed, and sends that image data to a recording and reproducing unit 151.

A development parameter generation unit 117 generates development parameters based on the image data developed by the development unit 110 and the recognition result from the recognition unit 131. Specifically, the development parameter generation unit 117 estimates the light source (color temperature) at the time of capturing from image data, decides a white balance value, and decides the necessity of correction for the subject region recognized by the recognition unit 131 and the range of the correction. For example, when the recognition unit 131 detects and recognize the face of a person or an animal as the subject, the development parameter generation unit 117 can determine whether red-eye has occurred in the face region, and decide the necessity of the red-eye correction processing and the region of eyes that is to be corrected and the like, according to a result of the determination.

In addition, the development parameter generation unit 117 generates development parameters for the simplified development unit 111 and development parameters for the high quality development unit 112. As described above, due to its structure, it is difficult for the simplified development unit 111 to execute a development process involving a very large throughput (e.g., noise reduction processing). Therefore, the development parameter generation unit 117 generates development parameters that are suitable for each of the high quality development unit 112 and the simplified development unit 111. When a parameter capturing mode, which will be described later, has been set by the operation unit 162, the development parameter generation unit 117 automatically generates a plurality of types of development parameters for a single piece of image data.

In the parameter capturing mode, when, for example, a backlit state is determined from developed image data, the development parameter generation unit 117 can generate a plurality of development parameters that can provide development results with varied exposure values as in bracket capturing. In addition, the development parameter generation unit 117 can determine an in-focus position within an image from a result of evaluation performed by the evaluation value calculation unit 105, and generate a development parameter that enlarges a portion near the in-focus position. These are merely examples. While the development parameter generation unit 117 can generate development parameters based on other conditions, it can automatically generate development parameters based on the captured image data.

A RAW compression unit 113 applies wavelet transform, differential encoding, and the like to the RAW image data output from the sensor signal processing unit 103 to generate compressed RAW data whose data amount has been reduced. The RAW compression unit 113 stores the compressed RAW data in the buffer unit 115. The buffer unit 115 may be any storage device, including, for example, a memory or an HDD. The compressed RAW data may be stored in the buffer unit 115, or may be moved further to a different recording medium after being stored, and be deleted from the buffer unit 115.

The recording and reproducing unit 151 records the still image data from the still image compression unit 141 and the moving image data from the moving image compression unit 142 in a recording medium 152. The recording and reproducing unit 151 records the still image and moving image data in the state of RAW data read out from the buffer unit 115 in the recording medium 152 as a RAW file separate from the compressed still image data and moving image data. The recording and reproducing unit 151 manages the data recorded in the recording medium 152 as a file in accordance with a known file system such as FAT. The recording medium 152 is, for example, a built-in memory or hard disk having a large capacity, or a removable memory card or the like. The recording and reproducing unit 151 can also read out a still image file, a moving image file, and a RAW file (still image, moving image) from the recording medium 152. The recording and reproducing unit 151 can write or read out various data files to and from an external storage or server via a communication unit 153. The communication unit 153 provides the imaging apparatus 100 with an access to a computer network or an external device by wireless communication or wired communication through a communication terminal 154. Aside from a wired terminal via Ethernet (®), USB or the like, a wireless terminal via IEEE802.11x, Bluetooth (®) or the like can be used as the communication terminal 154.

The recording and reproducing unit 151 obtains the desired file from the recording medium 152 or via the communication unit 153 and reproduces it. If the file to be reproduced is a RAW file, the recording and reproducing unit 151 stores the obtained RAW file in the buffer unit 115. If the file to be reproduced is a still image file, the recording and reproducing unit 151 supplies the obtained still image file to the still image decompression unit 143. If the file to be reproduced is a moving image file, the recording and reproducing unit 151 supplies the obtained moving image file to the moving image decompression unit 144.

The RAW decompression unit 114 reads out the RAW file stored in the buffer unit 115, and decodes and decompresses the compressed RAW data. The RAW data decompressed by the RAW decompression unit 114 is supplied to the simplified development unit 111 and the high quality development unit 112 of the development unit 110.

A still image RAW extraction unit 116 extracts (clips) a predetermined frame image from moving image data during moving image capturing in a parameter moving image capturing mode, which will be described later, and supplies the frame image to the simplified development unit 111 and the high quality development unit 112 of the development unit 110.

The still image decompression unit 143 decodes and decompresses the input still image file, and supplies the image file as the reproduced image of the still image to the display processing unit 122. The moving image decompression unit 144 decodes and decompresses the input moving image file, and supplies the image file as the reproduced image of the moving image to the display processing unit 122. The still image and moving image processed by the display processing unit 122 are displayed in the display unit 123.

Figure 2B:
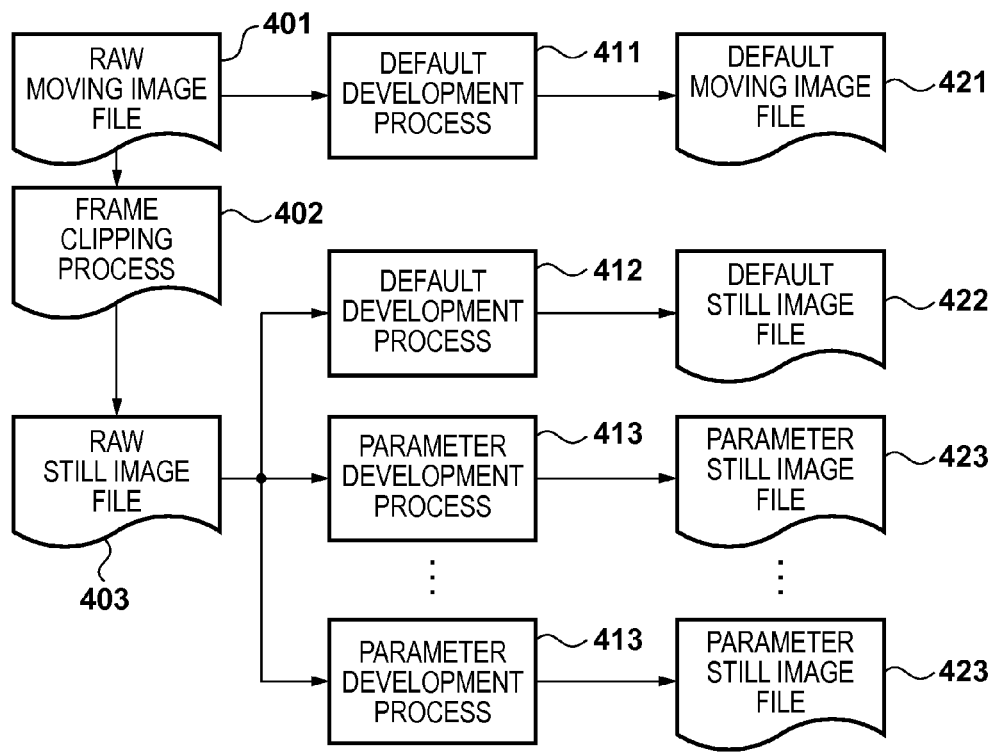

Next is a detailed description of operations of the imaging apparatus 100 in the parameter capturing mode. FIGS. 2A and 2B are diagrams schematically showing an overview of the operations of the imaging apparatus 100 in the parameter still image capturing mode and the parameter moving image capturing mode by using the relationship between data and processing.

In the parameter still image capturing mode, a default development process 311 using a default development parameter and a parameter development process 312 using a development parameter different from the default development parameter are executed on a single RAW still image file 301. A single default still image file 321 (first image data) is generated by the default development process 311. On the other hand, the parameter development process 312 is executed a plurality of times by using development parameters that are different from one another, and the corresponding parameter still image files 322 (third image data) are generated.

The parameter still image capturing mode enables still images developed with various development parameters to be acquired immediately following the end of capturing. Accordingly, even a user without a full understanding of the development process of RAW data can set a development parameter for acquiring a developed image according to the user's preference while comparing developed images.

In the parameter moving image capturing mode, a default development process 411 using the default development parameter is applied to a single RAW moving image file 401 to create a default moving image file 421 (first image data). In addition, a RAW still image file 403 (representative frame image) is generated from a predetermined frame included in the RAW moving image file 401 by a frame clipping process 402. This process is performed by the still image RAW extraction unit 116. Then, a default development process 412 and a parameter development process 413 are executed on the RAW still image file 403 to generate a single default still image file 422 and a plurality of parameter still image files 423 (third image data).

Since moving image data has a data amount far larger than that of still image data, it is not practical to perform different development processes on the entire moving image data, from the viewpoints of the scale of the integrated circuit mounted on the imaging apparatus 100 and the power consumption. Therefore, the parameter development process in the parameter moving image capturing mode is performed for a frame image (still image) clipped from a moving image file. Note that the frame image to which the parameter development process is applied can be extracted under various conditions, including, for example, extracting a characteristic frame image such as the top frame or a frame immediately after a scene change, and extracting frames every predetermined time or number of frames. Further, a predetermined numbers of frame images may be consecutively obtained, and be extracted in such a format as a short moving image.

The default development process is also performed for the same frame image as the parameter development process. By generating results of development on the still image also during moving image capturing in this way, results of development using various development parameters can be compared immediately after capturing, and it is thus possible to set a development parameter for obtaining a development result suitable to the user's preference.

Note that when the parameter capturing mode is not set (normal capturing mode), only the default development process is performed both during still image capturing and moving image capturing, and the default still image file 321 and the default moving image file 421 are generated.

Figure 3:
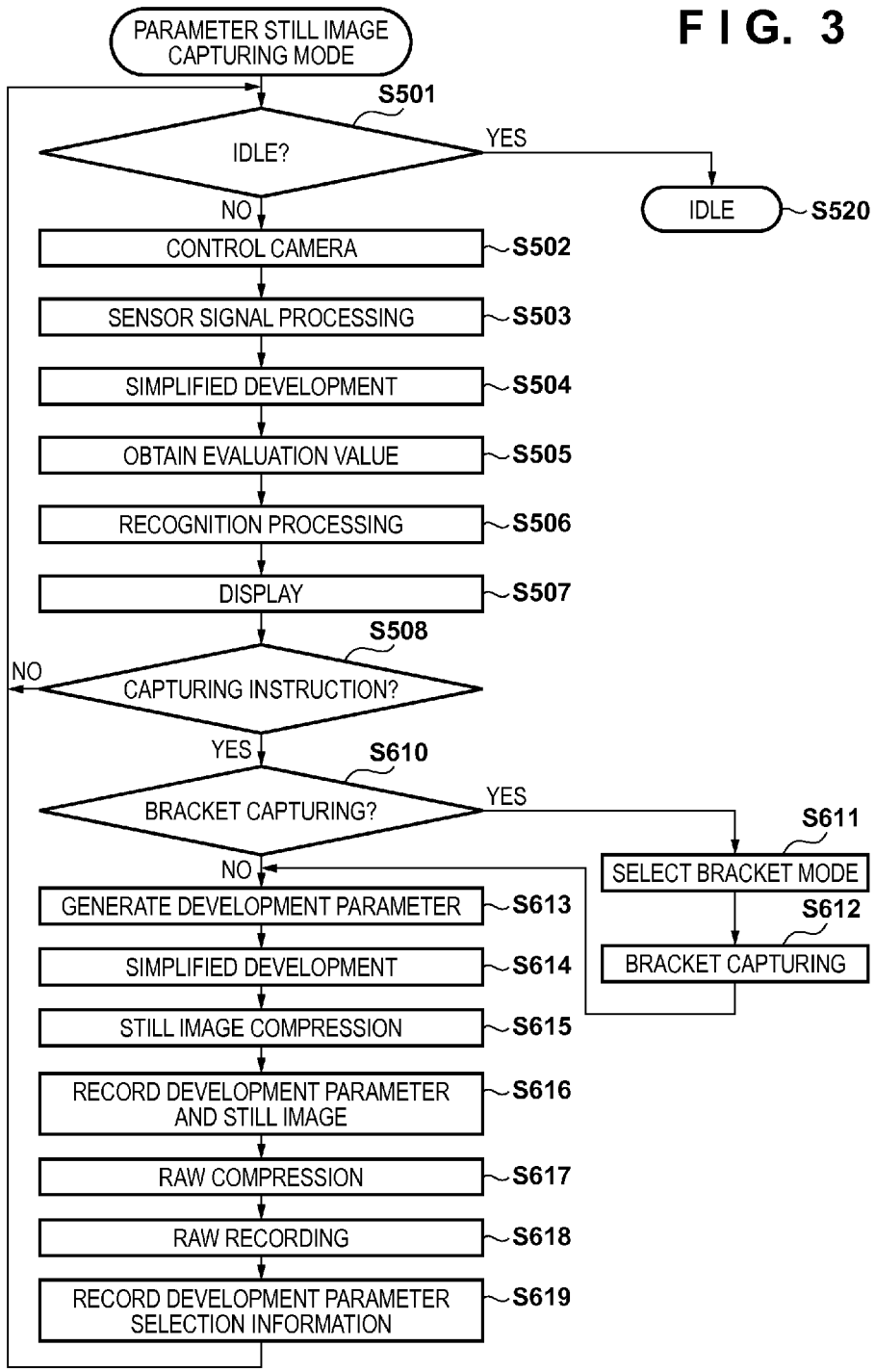
FIG. 3 is a flowchart illustrating operations in the parameter still image capturing mode of the imaging apparatus according to an embodiment.

Next is a description of specific operations of the imaging apparatus 100 in the above-described parameter still image capturing mode, with reference to the flowchart in FIG. 3. Unless otherwise specified, the flowchart in FIG. 3 illustrates the procedure of the processing implemented by the control unit 161 controlling the functional blocks shown in FIG. 1. Specifically, the processing is implemented by a program stored in a non-volatile memory included in the control unit 161 being extracted into a memory (RAM) and executed by the CPU.

The control unit 161 determines whether the processing load state of the imaging apparatus 100 is low (S501), and causes the processing to transition to the idle state according to the load state (S520); otherwise advances the processing to S502. The load state can be determined according to the operating ratio of the CPU included in the control unit 161, or whether a predefined high-load operation, including, for example, a rapid continuous shooting operation, is being performed, but the present invention is not limited thereto. If the processing load is not low enough to transition to the idle state, the control unit 161 advances the processing to S502. Note that the processing for determination as to whether to transition to the idle state will be described later.

At S502, the control unit 161 controls the operations of the imaging optical unit 101 and the image sensor unit 102. For example, the control unit 161 causes a zoom lens or a focus lens included in the imaging optical unit 101 to move in accordance with a zoom instruction or a capturing preparation instruction from the user through the operation unit 162, and sets the readout area of the image sensor unit 102 in accordance with an instruction regarding the number of captured pixels. In addition, the control unit 161 implements control of the focus and the tracking for a specific subject on the basis of the information on the evaluation values from the evaluation value calculation unit 105 and subject information from the recognition unit 131. At S502, capturing is performed under a capturing condition in accordance with a predetermined frame period.

At S503, the sensor signal processing unit 103 performs signal processing for pixel correction on the electric signal converted by the image sensor unit 102. For example, the sensor signal processing unit 103 performs interpolation using the values of surrounding pixels or subtraction of a predetermined offset value on an electric signal corresponding to a missing pixel of an image pickup element and an electric signal of a pixel having low reliability. In the present embodiment, image information that has undergone the processing at S503 and is output from the sensor signal processing unit 103 is referred to as RAW image, which means a raw (undeveloped) image.

At S504, the simplified development unit 111 develops the RAW image data. The development parameter used at this time is the default parameter generated by the development parameter generation unit 117, and is based on a result of performing auto white balancing, auto exposure processing or the like, such as a development parameter calculated in a commonly used imaging apparatus. Note that the control unit 161 controls the state of the switch unit 121 such that image data developed by the simplified development unit 111 is output from the development unit 110 by the start of S504 at the latest.

The simplified development unit 111 reduces the number of pixels of the RAW image data as described above, thus reducing the image. Then, the simplified development unit 111 performs debayering (demosaicing) on the reduced RAW image data to generate a color signal missing from each pixel, and thereafter converts the color signal into a signal composed of a luminance and a color difference (RGB to YUV conversion). Furthermore, the simplified development unit 111 removes noise contained in each signal, corrects the optical distortion (aberration) of an imaging optical system, and adjusts the white balance. As described above, the simplified development unit 111 performs the development process after reducing the number of pixels, or performs or omits noise removal and optical distortion correction by processing giving priority to the processing speed, thus reducing or removing the limitation on the capturing capacity of the imaging apparatus 100 imposed by the load (processing speed and power consumption) of the development process. With the use of the simplified development unit 111, it is possible to achieve, for example, a rapid continuous shooting speed or a number of continuously captured images that cannot be achieved in the case of using the high quality development unit 112.

The image data developed by the simplified development unit 111 is supplied to the evaluation value calculation unit 105 through the switch unit 121. The evaluation value calculation unit 105 calculates evaluation values such as the state of focus of the imaging optical unit 101 and the state of exposure of the image from the luminance value and the contrast value that are contained in the image data by a predetermined method (S505). Note that the evaluation value calculation unit 105 may calculate these evaluation values for the RAW image data prior to the development process.

The image data developed by the simplified development unit 111 is also supplied to the recognition unit 131 via the switch unit 121. The recognition unit 131 applies, to the image data, processing of detecting a subject (e.g., a person's face) having a predefined specific feature to generate subject information. For example, the recognition unit 131 outputs the presence or absence of a face in the image data, the position and the size of the face, information on the individual identified on the basis of the face, and the like as the subject information (S506).

The image data developed by the simplified development unit 111 is also supplied to the display processing unit 122 via the switch unit 121. The display processing unit 122 forms a display image from the obtained image data, and outputs and displays the display image to the display unit 123 or an external display device (S507). The display image displayed by the display unit 123 is used, for example, for a live-view display (capturing through-the-lens image display) for the user to appropriately frame the subject in the capturing standby state. Furthermore, the display processing unit 122 may display, for example, a frame-shaped mark indicating the focus area or the position of the recognized face in the display image in a superimposed manner by utilizing the evaluation values and the subject information supplied from the evaluation value calculation unit 105 and the recognition unit 131.

At S508, the control unit 161 determines whether a capturing instruction has been input from the user through the operation unit 162. If the capturing instruction has not been input, the processing from S501 is repeated.

If the capturing instruction has been input at S508, the control unit 161 controls, in response to the capturing instruction, the imaging optical unit 101 and the image sensor unit 102 to start capturing under a predetermined capturing condition. One screen worth of image data obtained by the image sensor unit 102 is supplied to the development unit 110 through the sensor signal processing unit 103, developed by the simplified development unit 111, and thereafter supplied to the still image compression unit 141. The one screen worth of image data obtained by the image sensor unit 102 is also supplied to the RAW compression unit 113. Then, the control unit 161 advances the processing to S610.

At S610, the control unit 161 determines whether it is necessary to additionally perform bracket capturing. It is determined that bracket capturing is necessary in the case where it is considered that an appropriate image is unlikely to be obtained under a single capturing condition, and examples of such a case include the following. (1) When it is judged that blocked-up shadows or blown-out highlights occurs due to a scene contrast greater than a threshold. (2) When a plurality of subjects recognized by the recognition unit 131 are located at a close distance and a far distance. It is determined that exposure bracket capturing is necessary for (1), and focus distance bracket capturing is necessary for (2). Of course, the necessity of different bracket capturing may be determined based on a different condition.

If it is determined that bracket capturing is necessary, the control unit 161 selects a bracket mode in accordance with the determination result (S611), and performs bracket capturing (S612). One screen worth of image data obtained by bracket capturing is also supplied to the development unit 110 and the RAW compression unit 113 through the sensor signal processing unit 103.

At S613, based on the developed image developed by the simplified development unit 111 and the evaluation value from the evaluation value calculation unit 105, and the recognition result from the recognition unit 131, a predetermined number (in the present embodiment, six types of) development parameters are created by the development parameter generation unit 117. Of the six types of the parameters, the development parameter generated at S504 is used as a first development parameter (default development parameter), and second to sixth development parameters are newly generated by the development parameter generation unit 117. The second to sixth development parameters may not be intended to faithfully recreate the information of an actual subject as the first development parameter. For example, they may be a development parameter for obtaining a monochrome image, a development parameter for leaving specific color information, and a development parameter for cropping a part of a captured image.

Using the first to sixth development parameters generated at S613, the simplified development unit 111 generates simplified still image data at S614. Here, as the simplified development still image in the first development parameter, the simplified still image generated at S504 may be used. The still image compression unit 141 performs high-efficiency encoding processing on the image data developed by the simplified development unit 111 to generate a still image file (S615). Note that the still image compression unit 141 performs the compression using a known still image compression technique such as JPEG. In the present embodiment, the still image data that is developed by the simplified development unit 111 and is encoded by the still image compression unit 141 during capturing in this manner is referred to as simplified still image data (first image data), and a data file containing the simplified still image data is referred to as simplified still image file. Note that the encoding method is not limited to the JPEG scheme, and any encoding method may be used.

Next, at S616, the recording and reproducing unit 151 records the first to sixth simplified still image files and the development parameters in the recording medium 152 in association with each other.

As described above, the one screen worth of RAW image data obtained by the image sensor unit 102 is further supplied to the RAW compression unit 113. The RAW compression unit 113 applies encoding (RAW compression) processing for reducing the data amount to the RAW image data to convert the RAW image data into compressed RAW image data (S617). The compressed RAW image data is stored in the buffer unit 115. Note that high-efficiency encoding performed by the RAW compression unit 113 is processed by a known technique such as wavelet transform or differential encoding, it may be either irreversible or reversible. Furthermore, the RAW compression performed by the RAW compression unit 113 may be omitted, and the RAW image may be output in the uncompressed state. Regardless of whether RAW compression is performed or not, RAW image data that enables a high-quality image to be generated and that does not significantly compromise the image information supplied from the sensor signal processing unit 103 is generated in the present embodiment.

At S618, the recording and reproducing unit 151 reads out the image data from the buffer unit 115, and records a data file (RAW file) in which the (compressed) RAW image data is stored in the recording medium 152.

Note that at least a part of the processing of generating and recording the simplified still image data (S613 to S616) and the processing of compressing and recording the RAW image data (S617 to S618) may be performed in parallel. In addition, at S615 and S618, the recording and reproducing unit 151 may send the still image file and/or the RAW file to an external storage from the communication terminal 154 via the communication unit 153, such that the still image file and/or the RAW file are recorded by the external storage.

At S619, the control unit 161 receives selection of a development parameter from the user at the time of displaying the recorded image for checking, stores the selection information in the buffer unit 115 in association with information (e.g., a file name) for identifying the image file, and thereafter returns the processing to S501. At S619, as in a reproduction mode, which will be described later, the selection of the development parameter can be received by displaying a list of results obtained by the simplified development using the six development parameters and allowing the user to select an image through the operation unit 162. Note that the selection information may be recorded in the recording medium 152. When there is no time to select a development parameter, for example, during continuous shooting or the like, the default development parameter is selected. The development parameter selected here is used during reproduction, or a post development, which will be described later.

When bracket capturing has been performed, it is possible to perform processing using a plurality of pieces of obtained image data, for example, processing such as generation of a HDR image using a plurality of images obtained by exposure bracket capturing. However, in terms of execution time, it is not desirable to generate an HDR image by the simplified development unit 111. Therefore, when exposure bracket capturing has been performed, the development parameter generation unit 117 generates a development parameter that is applied to a single RAW still image and in which the contrast value has been changed (decreased) for the simplified development unit 111. In addition, the development parameter generation unit 117 generates, for the high quality development unit 112, a development parameter for combining an image captured with appropriate exposure and an image obtained by exposure bracket capturing to generate an HDR image. Since an HDR image has a reduced contrast than the original image, the user can estimate an image generated by the high quality development unit 112 from the result of development by the simplified development unit 111.

Figure 4:
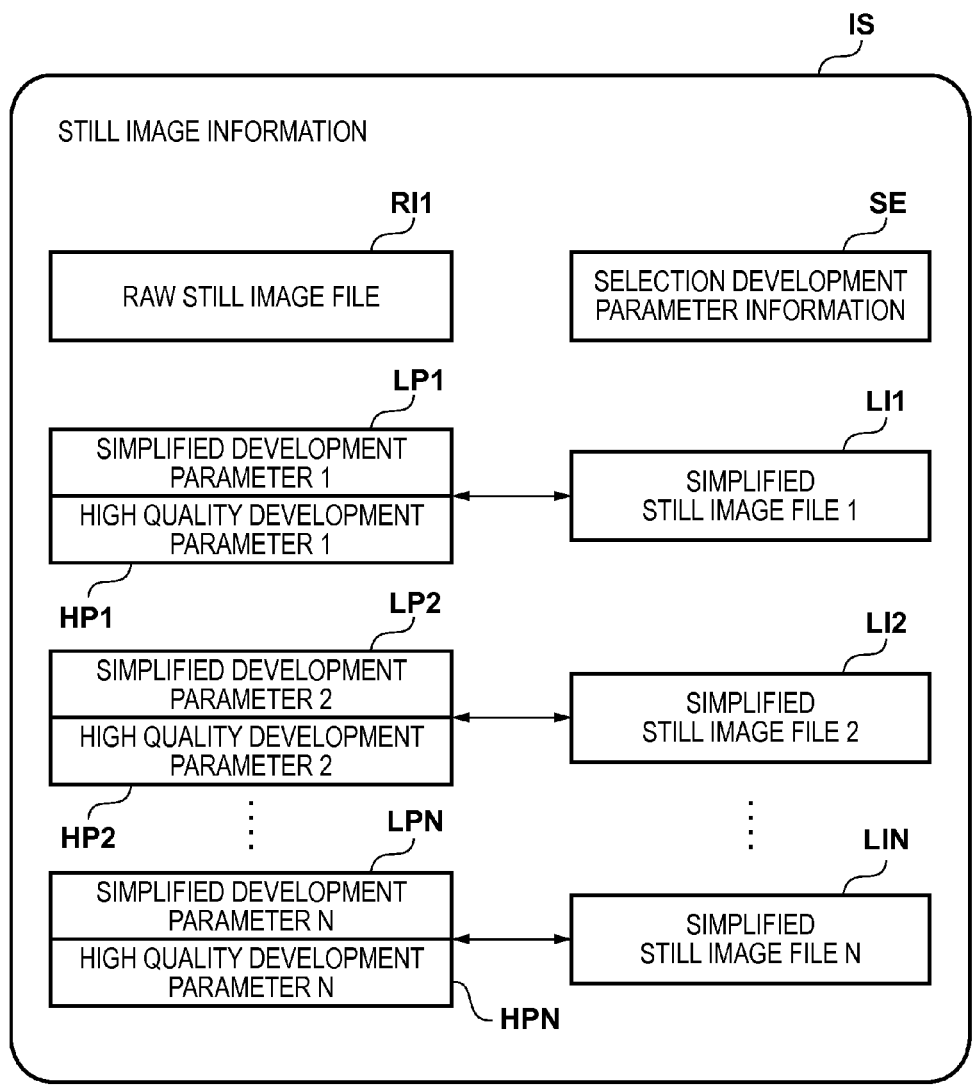
FIG. 4 is a diagram showing an example of information recorded in the parameter still image capturing mode by the imaging apparatus according to an embodiment.

FIG. 4 is a diagram showing an example of information recorded in the parameter still image capturing mode.

The imaging apparatus 100 of the present embodiment generates still image information IS for each capturing operation. In addition to one RAW still image file RI1 and one selection development parameter information SE, N (≥2) types of simplified development parameters LP1 to LPN, high quality development parameters HP1 to HPN and simplified still image files LI1 to LIN are contained in the still image information. The simplified development parameter LPN, the high quality development parameter HPN, the simplified still image file LIN are associated with one another, and the corresponding development parameters (LPN, HPN) can be easily identified from the simplified image file.

The selection development parameter information SE is information for identifying the development parameter used during reproduction or a post development, which will be described later. The selection development parameter information SE may be designated by the user immediately after capturing at S619, or automatically decided by the control unit 161, for example.

Note that in a normal still image capturing mode that is not the parameter still image capturing mode, only one type each of the development parameters LPN, HPN, and the simplified still image file LIN is recorded. Accordingly, the selection development parameter information SE always identifies the first development parameter.

Figure 5:
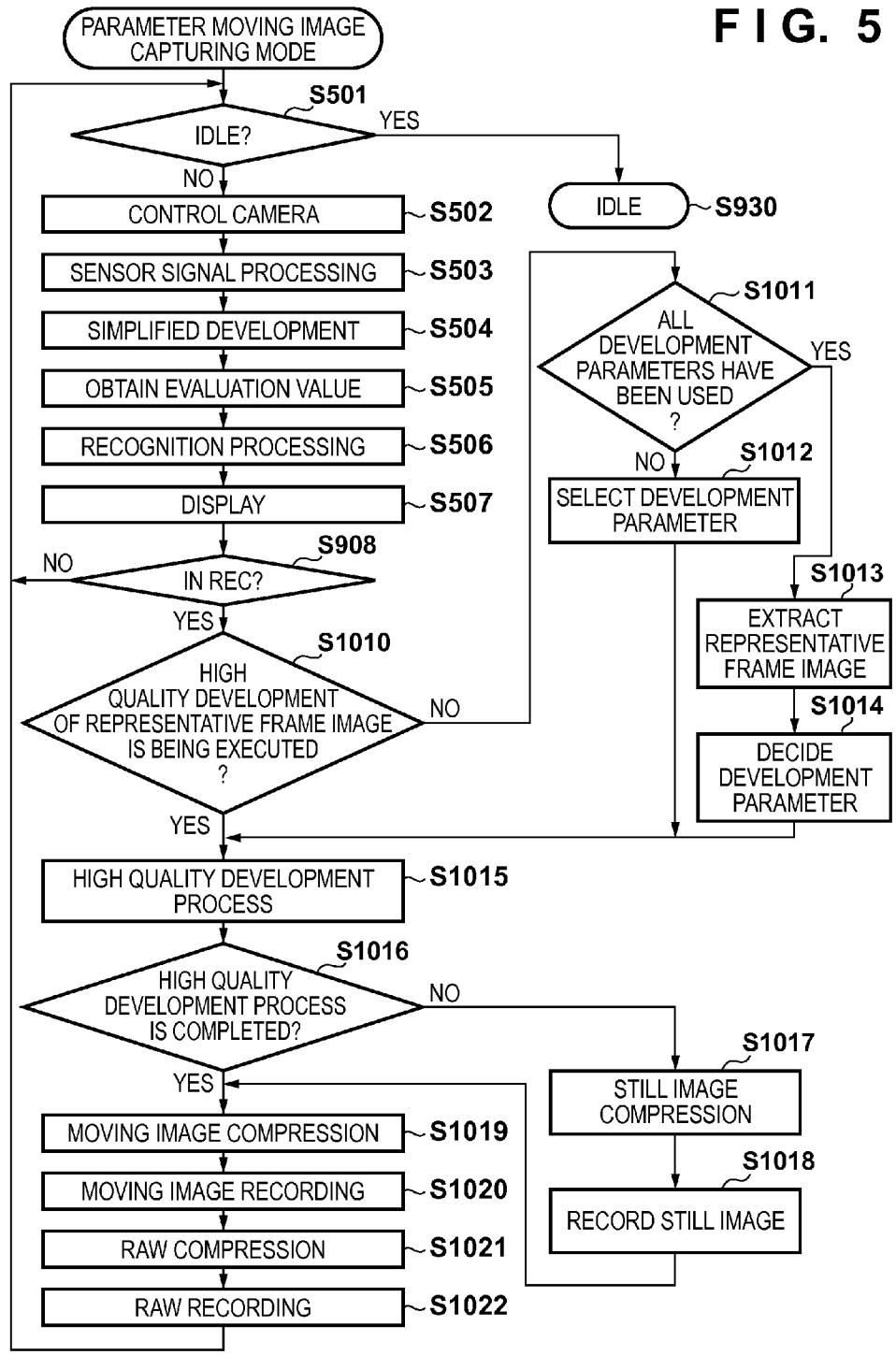
FIG. 5 is a flowchart illustrating operations in the parameter moving image capturing mode of the imaging apparatus according to an embodiment.

Next is a description of the specific operations in the parameter moving image capturing mode of the imaging apparatus 100, with reference to the flowchart in FIG. 5. Unless otherwise specified, the flowchart in FIG. 5 illustrates the procedure of the processing implemented by the control unit 161 controlling the functional blocks shown in FIG. 1. Specifically, the processing is implemented by a program stored in a non-volatile memory included in the control unit 161 being extracted into a memory (RAM) and executed by the CPU.

The description of the processing from S501 to S507 in FIG. 5, at which the same operations as those in the parameter still image capturing mode are performed, has been omitted.

At S908, the control unit 161 determines whether the captured moving image is being recorded (in REC) in response to an instruction to start recording from the user, and advances the processing to S1010 if it is in REC. If it is not in REC at S908 (i.e., is on standby), the control unit 161 returns the processing to S501, and repeats the moving image capturing operation and live-view display prior to the start of recording.

If it is judged at S908 that the moving image is in REC, the control unit 161 judges whether the high quality development unit 112 is executing the high quality development of the representative frame image for causing the user to select the development parameter used during the post development (S1010). If the high quality development of the representative frame image is being executed, the control unit 161 causes the high quality development being executed by the high quality development unit 112 to continue (S1015), but advances the processing to S1011 if the high quality development process is not being executed.

At S1011, the control unit 161 judges whether the development processes corresponding to all types of the development parameters, including the default development parameter, are completed for the same identical representative frame image. If there is any development parameter that has not been applied, the control unit 161 selects that development parameter (S1012), and causes the high quality development unit 112 to apply the corresponding high quality development process (S1015).

On the other hand, if there is no development parameter that has not been applied, the creation of the still image file for selecting the development parameter for a single frame image is completed. Accordingly, at S1013, the control unit 161 causes the still image RAW extraction unit 116 to extract a new representative frame image. Although representative frame images are sequentially extracted here, the condition for extracting the representative frame image may be preset as described above, and the processing may be transitioned to S1013 if this condition is satisfied.

When a new representative frame image has been extracted, the control unit 161 uses the development parameter generation unit 117 to decide a plurality of development parameters to be applied (S1014), selects one of the decided development parameters, and causes the high quality development unit 112 to execute a development process (S1015).

Since no development parameter is decided immediately after the start of recording, the control unit 161 determines at S1011 that there is no development parameter that has not been applied. Accordingly, the control unit 161 uses the development parameter generation unit 117 to decide a plurality of types of development parameters for extracting a representative frame image and developing the representative frame image, selects one of the decided development parameter, and causes the high quality development unit 112 to execute a development process.

Note that the development parameter generation unit 117 decides the development parameters each time a new representative frame image is extracted. However, in order to prevent a sudden change of the development parameter in the same scene, the same or substantially the same development parameter as the most recently decided development parameter is generated for representative frame images extracted from the same scene. Further, when the scene has suddenly changed from the previous representative frame image, the development parameter generation unit 117 may suddenly change the development parameter according to such a change. Although whether or not the scene has changed can be determined from the correlation between the previous representative frame image and the current representative frame image or a change in the average luminance, it is possible to use any known method.

The development process performed by the high quality development unit 112 requires more time than that required by the development process performed by the simplified development unit 111, and therefore may not be completed within one frame time (e.g., 1/30 seconds). Accordingly, the control unit 161 determines the execution status of the high quality development process at S1016. Then, if the high quality development process is completed, the still image compression processing in the still image compression unit 141 (S1017) and the recording processing in the recording and reproducing unit 151 (S1018) are executed on the representative frame image developed by the high quality development unit 112. In the recording processing, the encoded still image file and the information of the development parameter used are recorded in association with each other.

Meanwhile, the processing for recording a moving image is executed from S1019 onward. The frame image that has been subjected to the simplified development process by the simplified development unit 111 is compressed by the moving image compression unit 142 (S1019). Note that the compression processing performed by the moving image compression unit 142 is also applied to audio information that has been input by a microphone (not shown). In other words, the moving image compression unit 142 performs high-efficiency encoding processing (moving image compression) for the image information and audio information of the obtained moving image that has been subjected to the simplified development, thus generating a moving image file. Note that the moving image compression unit 142 performs the compression processing by using a known moving image compression technique such as MPEG-2, H.264, or H.265. At S1020, the recording and reproducing unit 151 records the moving image file generated by the moving image compression unit 142 in the recording medium 152.

In addition, the RAW image (RAW moving image) captured during the recording period is supplied from the sensor signal processing unit 103 to the RAW compression unit 113. The RAW compression unit 113 converts the RAW image into a RAW file by performing high-efficiency encoding (RAW compression), and stores the RAW file in the buffer unit 115 (S1021). The high-efficiency encoding performed by the RAW compression unit 113 is processed by a known technique such as wavelet transform or differential encoding, and it may be either irreversible or reversible. Alternatively, the RAW compression in the RAW compression unit 113 may be omitted, and the RAW image may be stored in the buffer unit 115 in the uncompressed state. Regardless of whether RAW compression is performed or not, a RAW file that can be restored as a high image quality file and that does not significantly compromise the image information supplied from the sensor signal processing unit 103 is generated in the present embodiment.

When the recording and reproducing unit 151 records the RAW file stored in the buffer unit 115 in the recording medium 152 at S1022, the control unit 161 returns the processing to S501.

At least a part of the processing of developing and recording the representative frame image (S1010 to S1018), the processing of compressing and recording the moving image data for which the image that has been subjected to the simplified development is used (S1019 to S1020), and the processing of compressing and recording the RAW image data (S1020 to S1022) may be performed in parallel. In addition, at S1018, S1020 and S1022, the recording and reproducing unit 151 may send the moving image file and/or RAW file from the communication terminal 154 to an external storage via the communication unit 153, and record the moving image file and/or RAW file with the external storage.

In the present embodiment, a description has been given of an example in which the high quality development unit 112, which is not used during moving image capturing, is used for the development process of the representative frame image. However, the simplified development unit 111 may be used when the load of the simplified development unit 111 is sufficiently low. In addition, even when the development process of the representative frame image is applied by the high quality development unit 112, a development parameter as in a case where a development process with quality similar to that of the simplified development unit 111 is applied may be supplied. By doing so, it is possible to reduce the processing required for the development process for generating the still image for selecting the development parameter, thus achieving a reduction in the power consumption of the imaging apparatus 100.

Figure 6:
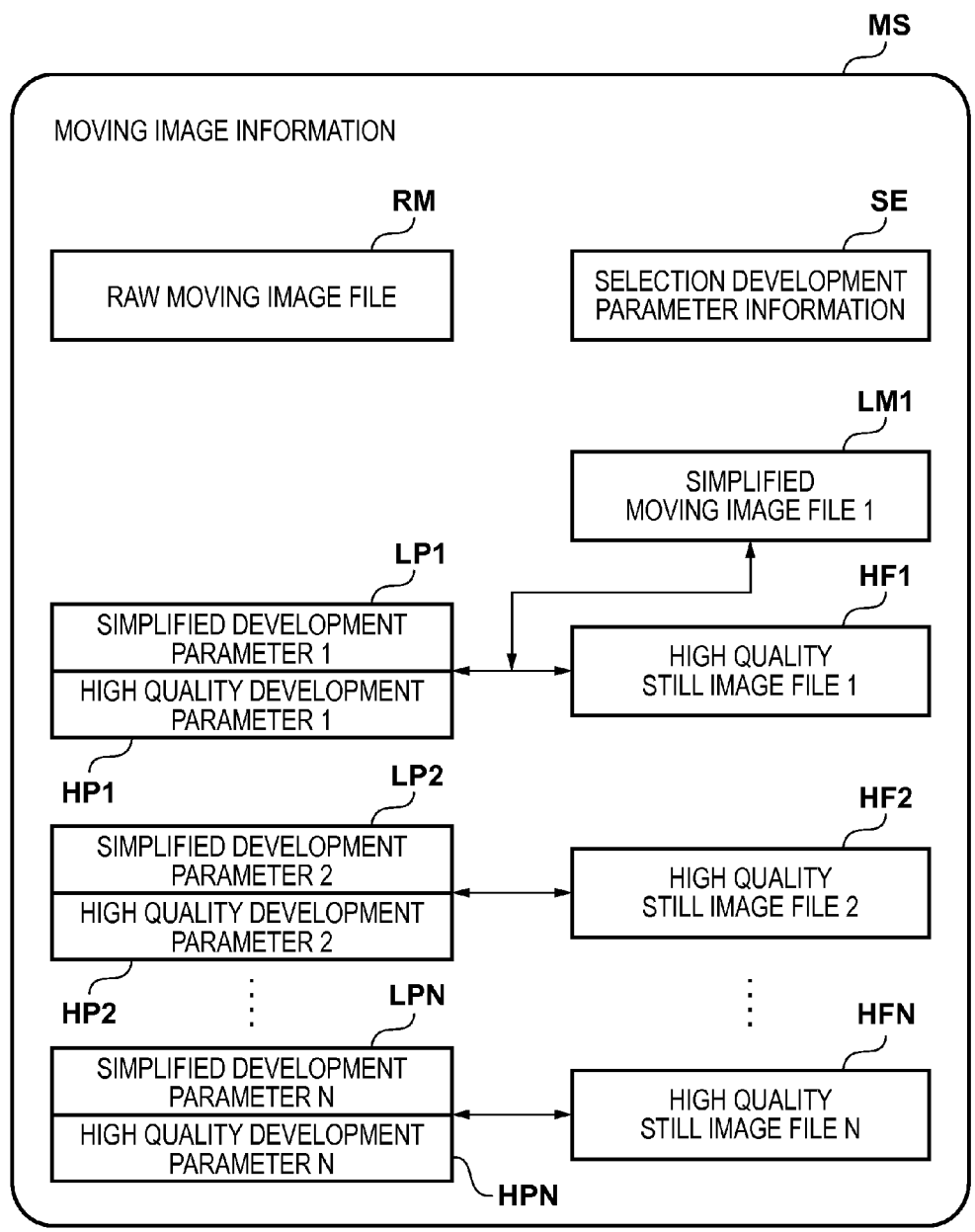
FIG. 6 is a diagram showing an example of information recorded in the parameter moving image capturing mode by the imaging apparatus according to an embodiment.

FIG. 6 is a diagram showing an example of the information recorded in the parameter moving image capturing mode.

The imaging apparatus 100 of the present embodiment generates moving image information MS for each single instance of moving image capturing. In addition to one RAW moving image file RM and one selection development parameter information SE, N ($\geq 2$) types of simplified development parameters LP1 to LPN, high quality development parameters HP1 to HPN and high quality still image files HF1 to HFN are contained in the moving image information. The simplified development parameter LPN, the high quality development parameter HPN, and the high quality still image file HFN are associated with one another, and the corresponding development parameters (LPN, HPN) can be easily identified from a high-quality image file.

The selection development parameter information SE is information for identifying the development parameter used during reproduction and a post development, which will be described later. The selection development parameter information SE may be designated by the user when the captured moving image in REC has become no longer in REC at S908 (immediately after capturing), or automatically decided by the control unit 161, for example.

Note that in a normal moving image capturing mode that is not the parameter moving image capturing mode, only one type each of the RAW moving image file RM, the development parameters LPN, HPN, and the simplified moving image file LIN is recorded, and no high quality still image file is recorded. Accordingly, the selection development parameter information SE always identifies the first development parameter.

Figure 7:
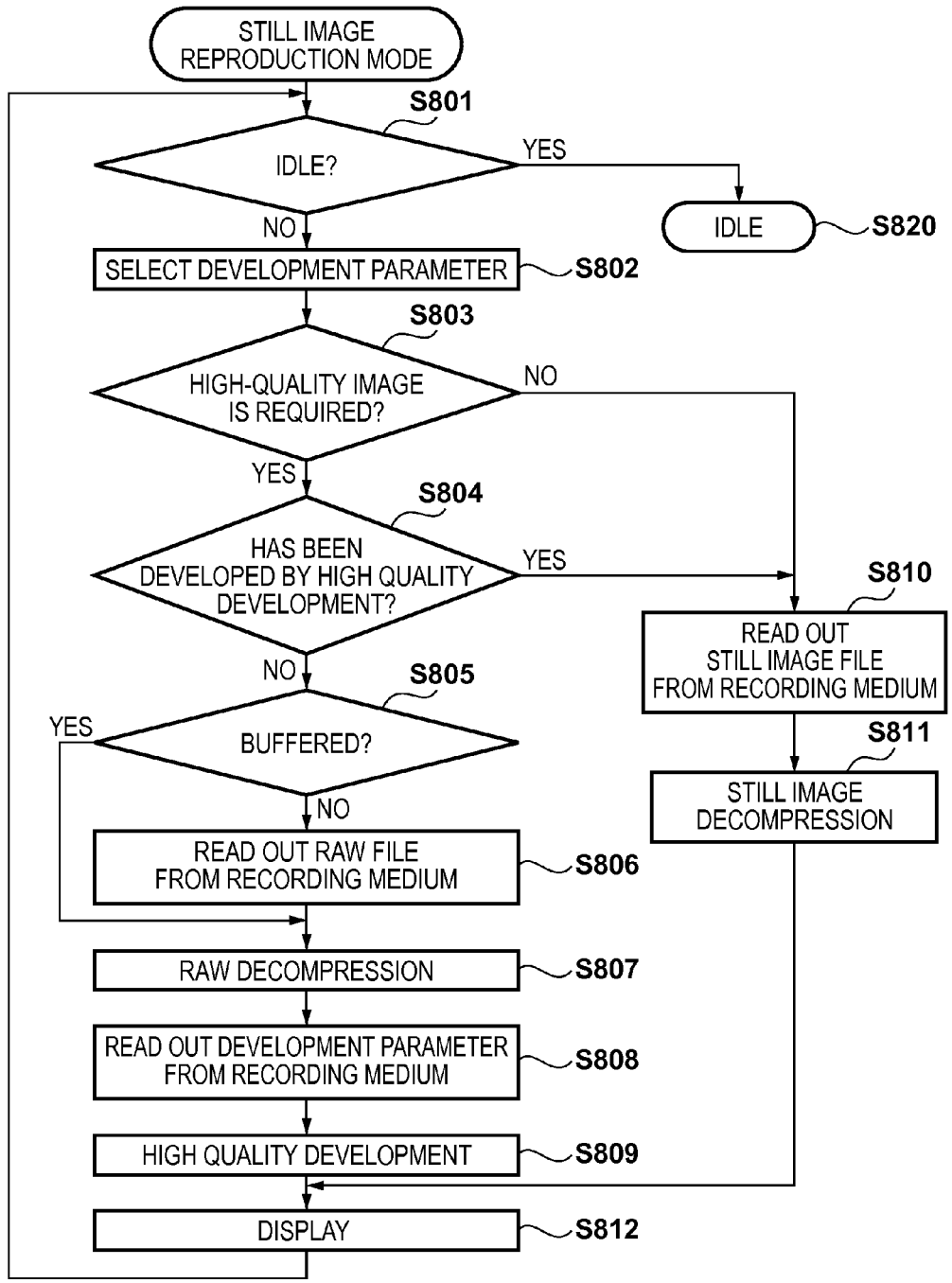
FIG. 7 is a flowchart illustrating operations in the still image reproduction mode of the imaging apparatus according to an embodiment.

FIG. 7 is a flowchart illustrating operations in the still image reproduction mode of the imaging apparatus 100 according to an embodiment. Unless otherwise specified, the flowchart in FIG. 7 illustrates the procedure of the processing implemented by the control unit 161 controlling the functional blocks shown in FIG. 1. Specifically, the processing is implemented by a program stored in a non-volatile memory included in the control unit 161 being extracted into a memory (RAM) and executed by the CPU.

Upon start of the processing of the still image reproduction mode, the control unit 161 determines whether the processing load state of the imaging apparatus 100 is low (S801), and causes the processing to transition to the idle state (S820) according to the load state; otherwise, it advances the processing to S802. The load state can be determined according to the operating ratio of the CPU included in the control unit 161, or whether a predefined high-load operation, including, for example, a rapid continuous shooting operation, is being performed, but the present invention is not limited thereto. If the processing load is not low enough to transition to the idle state, the control unit 161 advances the processing to S802. Note that the processing for determination as to whether to transition to the idle state will be described later.

Note that there is no particular limitation on the method for deciding a still image to be displayed, and the still image may be decided under a predefined condition. For example, the still image to be displayed may be selected by the user from a list display screen or the like, or may be the still image most recently recorded in the recording medium 152. Here, it is assumed that a single still image file to be reproduced is specified in some way.

At S802, the control unit 161 decides a reproduction development parameter for the still image file to be displayed. While the reproduction development parameter can be decided in various ways, it is possible to cause the user to select the reproduction development parameter by using the simplified still image file generated during recording.

Figure 8:
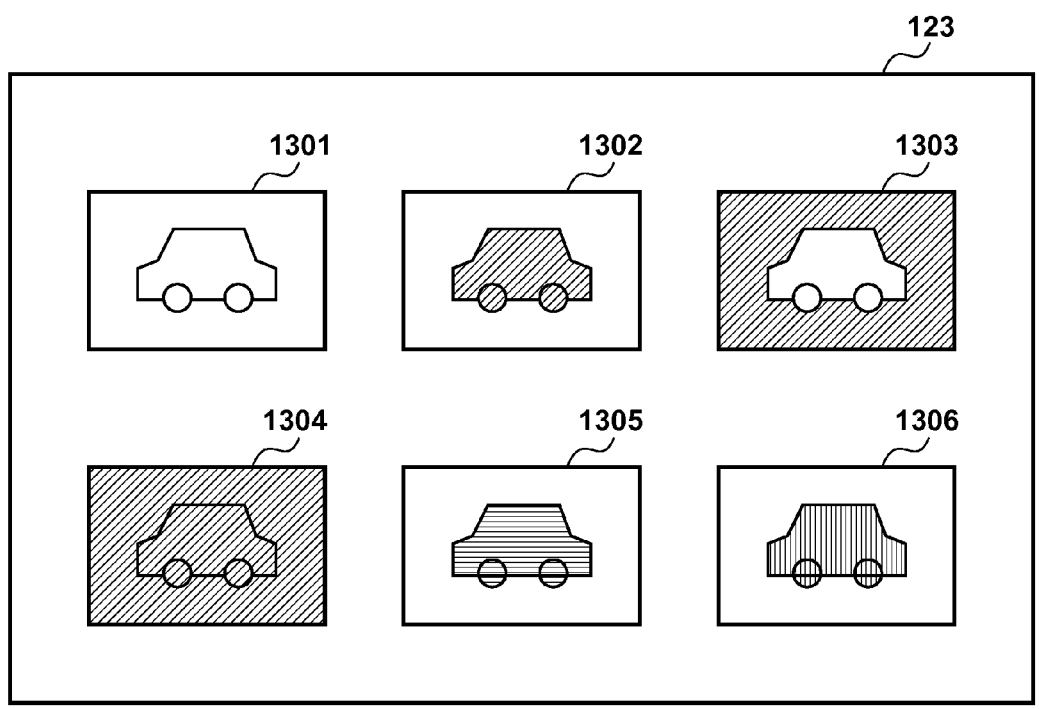
FIG. 8 is a diagram showing an example of a development parameter selection screen displayed by the imaging apparatus according to an embodiment.

FIG. 8 is a diagram showing an example of a development parameter selection screen. At S802, when the control unit 161 causes the user to select the development parameter, the control unit 161 reads out the simplified still image file stored during capturing from the recording medium 152 through the recording and reproducing unit 151, and supplies the simplified still image file to the display processing unit 122. The display processing unit 122 selectably displays a list of reduced images 1301 to 1306 of the simplified still image file in the display unit 123 in a predefined layout.

Upon detection of selection of one of the reduced images 1301 to 1306 through the operation unit 162, the control unit 161 decides the development parameter used for the selected image as the reproduction development parameter. Thus, the user can set the development parameter by selecting a favored image from among the images that are displayed in the display unit 123 and that have been obtained by using different development parameters for the same image. Accordingly, the user can set the development parameters for obtaining a desired development result, without performing the detailed parameter settings. In addition, as a feature of the present embodiment, it is possible to display the selection screen of FIG. 8 by using a still image file that has been generated in advance, thus making it possible to significantly reduce the time required for display of the selection screen as compared with a configuration that applies the development process after recording by using individual development parameters.

Note that for a still image file for which the selection of the development parameter has already been completed at S619 or the like, the processing for selecting the development parameter may be omitted. The use of the development parameter identified by the selection development parameter information SE may be decided, without performing the processing for selecting the development parameter, and the processing may be advanced to S803. However, a menu or the like for the user to instruct display of the selection screen shown in FIG. 8 is provided so that the user can select the development parameter during reproduction.

Note that the selection of development parameters through the selection screen shown in FIG. 8 can also be performed in the case of causing the user to select the development parameter at S619. In the case of causing the user to select the development parameter, it is possible to permit the selection of a plurality of images in the selection screen. In this case, information for identifying a plurality of development parameters corresponding to the selected images is recorded in the selection development parameter information SE. When a plurality of development parameters are selected, a plurality of images may be displayed also in the reproduction processing, or only the image corresponding to one of the plurality of development parameters may be displayed.

At S803, the control unit 161 determines whether a high-quality image is required for the still image to be reproduced, and advances the processing to S804 if it is required, and advances the processing to S820 if it is not required. In the present embodiment, examples of the case in which a high-quality image is required include, but are not limited to, a case where enlarged display is set for the image and a case where the number of pixels in the display area is greater than the number of pixels of the simplified still image file.

At S804, the control unit 161 determines whether the still image file to be displayed has been subjected to the high quality development, and advances the processing to S820 if the high quality development process has been already applied by applying a post development, which will be described later, and if not, advances the processing to S805.

At S805, the control unit 161 checks whether the RAW file corresponding to the still image file to be reproduced is present in the buffer unit 115.

Then, the control unit 161 advances the processing to S807 if the RAW file is present in the buffer unit 115. If the RAW file is not present, the control unit 161 reads out the RAW file from the recording medium 152 through the recording and reproducing unit 151, stores it in the buffer unit 115 (S806), and thereafter, advances the processing to S807. A predefined number of RAW files are held in the buffer unit 115, starting from the most recently captured RAW file. Accordingly, the control unit 161 knows that the RAW file corresponding to the still image file to be reproduced is stored in the buffer unit 115 if the RAW file is included in the predefined number of RAW files starting from the most recently captured RAW file recorded in the recording medium 152. Note that the control unit 161 may obtain information on the RAW file obtained during recording from the recording and reproducing unit 151, and store the correspondence between the RAW file stored in the buffer unit 115 and the RAW file recorded in the recording medium 152.

In the case of reading out the RAW files from the recording medium 152, the control unit 161 reads out the RAW files in a chronological order, and stores them in the buffer unit 115. Then, when the storage area in the buffer unit 115 becomes full, the oldest RAW image data is deleted from the buffer unit 115, and RAW image data that is newly captured or read out from the recording medium 152 is stored in the buffer unit 115. By doing so, the most recently captured RAW image data is always held in the buffer, and therefore, S806 can be skipped, thus performing the process at high speed.

At S807, the control unit 161 supplies the RAW image data from the buffer unit 115 to the RAW decompression unit 114. The RAW decompression unit 114 outputs the RAW image data after restoring the RAW image data by decompression if it has been compressed, or directly outputs the RAW image data if it has not been compressed. Whether or not the RAW image data has been compressed can be determined, for example, by recording identifiable information at the head of the RAW image data during compression.

At S808, the control unit 161 reads out, from among the development parameters decided at S802, a high quality development parameter from the recording medium 152 through the recording and reproducing unit 151, and causes the development parameter generation unit 117 to set the high quality development parameter in the high quality development unit 112. The high quality development unit 112 develops the RAW image data supplied from the RAW decompression unit 114 by using the development parameter set from the development parameter generation unit 117 (S809).

The high quality development unit 112 applies the so-called development process, including, for example, debayering (demosaicing) a RAW image to convert the image into signals composed of a luminance and a color difference, removing noise contained in each signal, correcting optical distortion, and performs image optimization. In addition, the high quality development unit 112 applies a simple image correction processing such as resizing, enlargement and reduction processing, and partial blurring processing of images. The number of pixels of a developed image generated by the high quality development unit 112 remains the same as the number of pixels read out from the image sensor unit 102, or is a number of pixels set by the user. Accordingly, the number of pixels of the image data from the high quality development unit 112 is larger than that of the image data output from the simplified development unit 111. Therefore, an image obtained by the high quality development unit 112 has higher quality than an image obtained by the simplified development unit 111, and can address a request for enlarged display or the like with sufficient image quality.

The image obtained by the high quality development unit 112 is input to the display processing unit 122 via the switch unit 121.

If it is determined at S804 that a still image file that has been already subjected to the high quality development is present, the control unit 161 reads out that still image file from the recording medium 152 through the recording and reproducing unit 151 (S810), and supplies the still image file to the still image decompression unit 143. The still image decompression unit 143 decompresses the still image file (S811), and outputs it to the display processing unit 122.

At S812, the display processing unit 122 outputs the still image input from the high quality development unit 112 or the still image decompression unit 143 to the display unit 123 or the like. Upon completion of the display, the control unit 161 returns the processing to S801.

The high quality development process applied at S805 onward in FIG. 7 is expected to be performed at timing when a post development, which will be described later, has not been applied, such as immediately after capturing. In the present embodiment, a post development for still images is sequentially executed in a user operation waiting state in which the processing load of the apparatus is relatively small, including, for example, during intervals between captures, in the capturing mode, and in the sleep state, and the still image files obtained by the simplified development are automatically replaced with the still image files obtained by high quality development. As the replacement advances in this way, the occurrences of the high quality development performed at S805 onward are reduced, and a high quality image can be output promptly, resulting in an even more improved operability.

Figure 9:
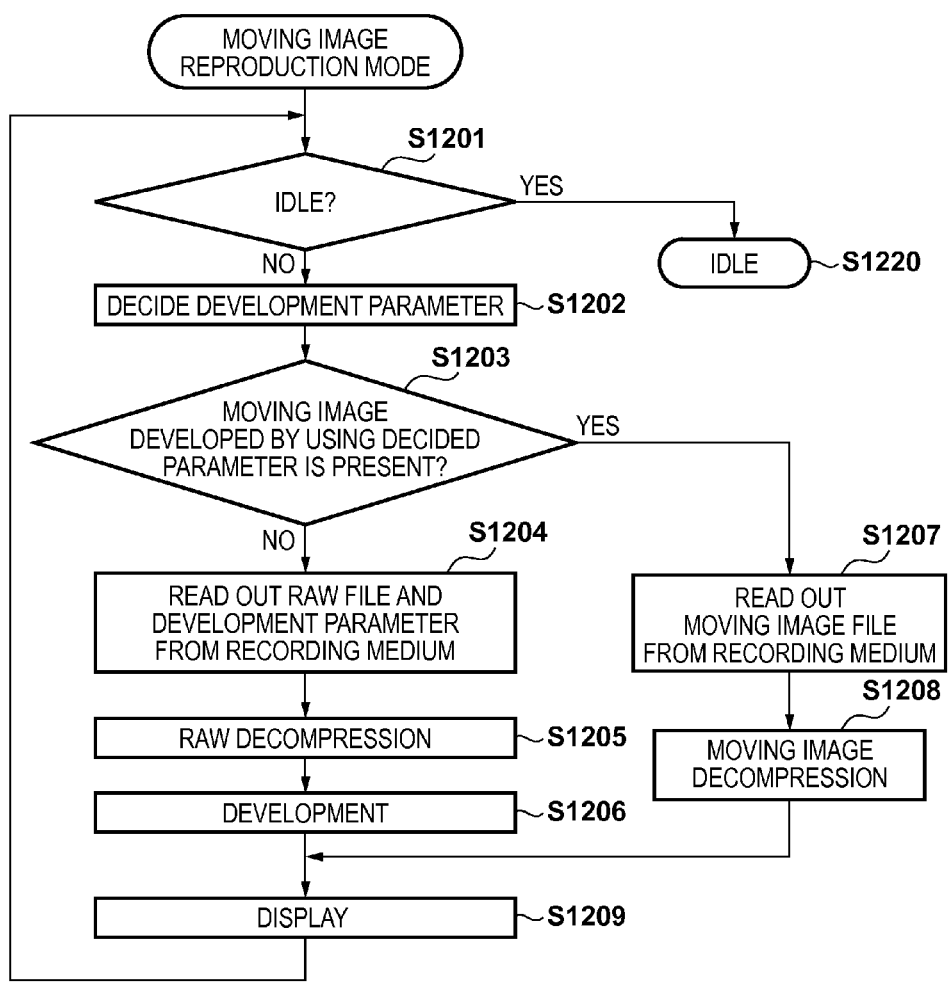
FIG. 9 is a flowchart illustrating operations in the moving image reproduction mode of the imaging apparatus according to an embodiment.

FIG. 9 is a flowchart illustrating operations in the moving image reproduction mode of the imaging apparatus 100 according to the present embodiment. Unless otherwise specified, the flowchart in FIG. 9 illustrates the procedure of the processing implemented by the control unit 161 controlling the functional blocks shown in FIG. 1. Specifically, the processing is implemented by a program stored in a non-volatile memory included in the control unit 161 being extracted into a memory (RAM) and executed by the CPU.

Upon start of the processing of the moving image reproduction mode, the control unit 161 determines whether the processing load state of the imaging apparatus 100 is low (S1201), and causes the processing to transition to the idle state according to the load state (S1220); otherwise advances to S1202. For example, the processing load is low while the apparatus is waiting for a user operation such as a reproduction instruction, and therefore, the control unit 161 advances to S1220. If the processing load is not low enough to transition to the idle state, the control unit 161 advances the processing to S1202.

Note that there is no particular limitation on the method for deciding a moving image to be reproduced, and the moving image may be decided under a predefined condition. For example, the moving image to be reproduced may be selected by the user from a list display screen or the like, or may be the moving image most recently recorded in the recording medium 152. Here, it is assumed that a single moving image file to be reproduced is specified in some way.

At S1202, the control unit 161 decides a reproduction development parameter for the moving image file to be reproduced. While the reproduction development parameter can be decided in various ways, it can be selected by the user by using the still image file generated during recording, as described with reference to FIG. 8. However, since the subject to be reproduced is a moving image, the reduced images to be displayed in the selection screen are generated from the high quality still image files HF1 to HFN. Note that when there are a plurality of representative frame images, a list of the representative frame images developed using the default development parameter is displayed, and the user is caused to select one of the representative frame images. Thereafter, the selection screen shown in FIG. 8 is displayed by using the corresponding high quality still image files HF1 to HFN.

Note that the use of the development parameter identified by the selection development parameter information SE may be decided, without performing the processing for selecting the development parameter, and the processing may be advanced to S1203. However, a menu or the like for the user to instruct display of the selection screen shown in FIG. 8 is provided so that the user can select the development parameter during reproduction. In the case of causing the user to select the development parameter, it is possible to permit the selection of a plurality of images in the selection screen. In this case, information for identifying a plurality of development parameters corresponding to the selected images is recorded in the selection development parameter information SE. When a plurality of development parameters are selected, only the moving image corresponding to one of the plurality of development parameters is displayed in the reproduction processing for a moving image. For example, the image that has been subjected to the high quality development may be preferentially displayed.

At S1203, the control unit 161 determines whether the moving image developed by using the decided development parameters is present, and advances the processing to S1207 if it is present, and advances the processing to S1204 if it is not present.

At S1204, the control unit 161 reads out the RAW moving image file RM and, from among the development parameters decided at S1202, the simplified development parameter from the recording medium 152 through the recording and reproducing unit 151. Then, the control unit 161 supplies the RAW moving image file RM and the development parameter to the RAW decompression unit 114 and the development parameter generation unit 117, respectively. Note that the readout of the RAW moving image file at S1204 is performed, for example, for every number of frames corresponding to 1 to a coding unit (e.g., GOP). Unless the development parameter is changed, it is sufficient that the readout of the development parameters is performed once.

At S1205, the RAW decompression unit 114 outputs the RAW moving image data after restoring the RAW moving image data by decompression if it has been compressed, or directly outputs the RAW moving image data if it has not been compressed.

The development parameter generation unit 117 sets the simplified development parameter in the simplified development unit 111. The simplified development unit 111 develops the RAW moving image data supplied from the RAW decompression unit 114 by using the development parameter set from the development parameter generation unit 117 (S1206).

If it is judged at S1203 that a moving image file that has already been developed is present, the control unit 161 reads out that moving image file from the recording medium 152 through the recording and reproducing unit 151 (S1207), and supplies the moving image file to the moving image decompression unit 144. The moving image decompression unit 144 decompresses the moving image file frame by frame (S1208), and outputs it to the display processing unit 122.

At S1209, the display processing unit 122 outputs the frame image input from the simplified development unit 111 or the moving image decompression unit 144 to the display unit 123 or the like. Upon completion of the display, the control unit 161 returns the processing to S1201, and continues the reproduction of the moving image file. During reproduction of the moving image file, the processing for deciding the development parameters at S1202 may be skipped unless an instruction to display the selection screen is given by the user.

Thus, the imaging apparatus 100 of the present embodiment can reproduce a moving image easily and without delay, by using the moving image file that has been subjected to the simplified development during capturing. Further, the reproduction is also easily performed by using a development parameter that is different from the development parameter used for the simplified development.

In the present embodiment, when the development is performed during reproduction, the development is performed by using the simplified development unit 111 at S1206 in order to shorten the reproduction waiting time. However, when priority is given to the image quality rather than the waiting time, a moving image having higher quality may be reproduced by applying the development process by the high quality development unit 112 by using the high quality development parameter. For example, in the case of causing the user to select the development parameter at S1202, it is possible to adopt a configuration in which the user is also caused to select the image quality, or a configuration in which the selection screen for changing the image quality can be displayed in accordance with a user instruction during reproduction of the moving image.

Note that as with still images, moving images are also sequentially subjected to image enhancement by a post development process, which will be described later. Accordingly, in accordance with the passage of time after capturing, the possibility that the high quality development process from S1204 to S1206 is performed during reproduction is reduced, and the probability that a high quality image can be promptly output is increased, thus resulting in an even more improved operability.

Next is a description of a process of post development in the present embodiment. The post development process is a process of generating high-quality still image/moving image data from RAW image data and recording the generated data, after completion of the operation of recording the RAW image data and the simplified still image/moving image data during capturing. Specifically, first, the RAW still image/moving image data recorded in the buffer unit 115 or the recording medium 152 or the like is read out, and developed by the high quality development unit 112. Then, high-quality encoded image data (second image data) is generated in the still image compression unit 141 or the moving image compression unit 142, and the generated image data is recorded in the recording medium 152. In the present embodiment, the post development process is applicable to the RAW image data of a still image and a moving image, and a description will be first given, taking a still image as an example.

As described above, the simplified still image data recorded during capturing has been compressed after being developed by the simplified development unit 111. Accordingly, the image quality may be inferior or the number of pixels may be smaller, as compared with the case where the RAW image data has been developed by the high quality development unit 112. The quality of the simplified still image data may be sufficient to roughly check the captured content immediately after capturing or to display the captured content in a display device with a small pixel number, such as the display unit 123 of the imaging apparatus 100, but may not be sufficient to check the details of the image or to print out the image.

The user may, of course, apply a high quality development process to the RAW image data as needed, but this requires time and effort. For this reason, in the present embodiment, the post development process is automatically executed when the imaging apparatus 100 is in an idle state. The idle state refers to a state in which the processing load of the imaging apparatus 100 is determined to be small, including, for example, during standby for capturing, a standby state during reproduction of a still image, and a sleep state. Note that in addition to being performed automatically, the post development process may be started in accordance with an instruction from the user.

There is no particular limitation on the method for determining whether or not the imaging apparatus 100 is in the idle state, and it is possible to use any determination method, including, for example, a commonly used measurement method for the processing load. For example, the determination may be made based on whether the operating ratio of the CPU included in the control unit 161 is less than a predefined threshold, or whether a predefined high-load operation such as a rapid continuous shooting operation or recording and reproducing processing is being performed. Alternatively, the imaging apparatus 100 may be unconditionally regarded as being in the idle state if an operating mode in which basically only a low-load process occurs is selected.

Next is a description of the idle process performed at S520 in FIG. 3 and S820 in FIG. 7, with reference to the flowchart in FIG. 10.

The flowchart in FIG. 10 illustrates the procedure of processing executed by the control unit 161 controlling various processing blocks. The processing illustrated by the flowchart in FIG. 10 is executed by a program stored in a memory (ROM) included in the control unit 161 being extracted into another memory (RAM) and executed by the CPU.

Upon start of the processing in the idle state in FIG. 10, the control unit 161 determines, based on the user's setting, whether or not to perform the post development (S1001). If the post development is not to be performed, the control unit 161 ends the idle process, and returns to the original processing, and if the post development is to be performed, the processing transitions to S1020.

In the case of performing the post development, the control unit 161 determines whether a high-quality still image file has been recorded by the post development process (whether it has been subjected to the post development) for each RAW file recorded in the recording medium 152 (S1020). For example, the control unit 161 refers to the development status contained in the header of the RAW file, and determines that the RAW file has not been subjected to the post development if the development status contains information indicating that the corresponding still image file has been processed by the simplified development unit 111. Alternatively, the control unit 161 searches for a still image file having the still image file name contained in the metadata of the RAW file in the recording medium 152. This is based on the fact that if capturing has been performed in the still image capturing mode, one or more still image files and RAW files are recorded in association with each other for a single capturing start instruction in the recording medium 152. Then, the control unit 161 refers to the development status stored in the metadata portion of the found still image file. If the development status contains the information indicating that the still image file has been processed by the simplified development unit 111, the control unit 161 determines that the RAW file has not been subjected to the post development. Alternatively, a table indicating whether or not the post development process has been executed may be separately provided for a series of still images, and the determination may be made by referring to this table. Note that if there is the possibility that a plurality of development parameters are selected, the control unit 161 performs the determination based on whether all of the still image files corresponding to the development parameters identified by the selection development parameter information SE have been subjected to the high quality development.

If all of the RAW files recorded in the recording medium 152 have been subjected to the post development process (S1020, NO), the control unit 161 ends the idle process as in the case where the post development process is not applied, and returns to the original processing. On the other hand, if any RAW file to which the post development process has not been applied is present in the RAW files recorded in the recording medium 152, the control unit 161 causes the processing to transition to S1021.

The control unit 161 checks whether the RAW image data corresponding to the RAW file that is recorded in the recording medium 152 and to which the post development process has not been applied is also stored in the buffer unit 115 (S1021). Then, the control unit 161 reads out the RAW file directly from the buffer unit 115 if the RAW file remains in the buffer unit 115, or from the recording medium 152 at S1022 if the RAW file does not remain in the buffer unit 115, and thereafter advances the processing to S1023. A predefined number of RAW files are held in the buffer unit 115, starting from the most recently captured RAW file. Accordingly, the control unit 161 knows that the RAW file to which the post development process is applied is stored in the buffer unit 115 if the RAW file is included in the predefined number of RAW files starting from the most recently captured RAW file of the RAW files recorded in the recording medium 152. Note that the control unit 161 may obtain information on the RAW file obtained during recording from the recording and reproducing unit 151, and store the correspondence between the RAW file stored in the buffer unit 115 and the RAW file recorded in the recording medium 152.

Note that if there are a plurality of RAW files to which the post development process has not been applied and that are not present in the buffer unit 115, the control unit 161 may read out these RAW files one by one, and apply the post development process thereto, or may read out any number of RAW files at once within a range that can be stored in the buffer unit 115.

In the case of reading out the RAW files from the recording medium 152, the control unit 161 reads out the RAW files in a chronological order, and stores them in the buffer unit 115. Then, when the storage area in the buffer unit 115 becomes full, the oldest RAW image data is deleted from the buffer unit 115, and RAW image data that is newly captured or read out from the recording medium 152 is stored in the buffer unit 115. By doing so, the most recently captured RAW image data is always held in the buffer, and therefore, S1022 can be skipped, thus performing the process at high speed. Furthermore, by executing the post development process backward in time from the most recently captured image, the process can be completed preferentially from the images held in the buffer unit 115, and it is thus possible to increase the processing efficiency.

At S1023, the control unit 161 supplies the RAW image data to be subjected to the post development process to the RAW decompression unit 114. The RAW decompression unit 114 outputs the RAW image data after restoring the RAW image data by decompression if it has been compressed, or directly outputs the RAW image data if it has not been compressed. Whether or not the RAW image data has been compressed can be determined, for example, by recording identifiable information at the head of the RAW image data during compression.

The RAW image data output by the RAW decompression unit 114 is supplied to the development unit 110. During the post development process, the control unit 161 controls the operation such that the development process is applied by the high quality development unit 112 and the development process is not applied by the simplified development unit 111. At S1024, the control unit 161 controls the recording and reproducing unit 151 to read out, from the recording medium 152, the high quality development parameter from among the development parameters identified by the selection development parameter information SE, and supplies the high quality development parameter to the development parameter generation unit 117. The development parameter generation unit 117 sets this development parameter in the high quality development unit 112. Note that the high quality development parameter may be read out at S1022.

The high quality development unit 112 applies a development process to the RAW image data supplied from the RAW decompression unit 114 by using the high quality development parameter set from the development parameter generation unit 117. The high quality development unit 112 performs a development process that can provide an image having higher quality than that obtained by the simplified development unit 111. In the present embodiment, the high quality development unit 112 does not reduce the number of pixels of the RAW image data, and increases the quality (e.g., precision and the number of steps) of the development process applied than that of the simplified development unit 111. However, there is no limitation on the specific details of the development process performed by the high quality development unit 112, as long as image processing that can provide an image having higher quality than that obtained by the simplified development unit 111 is performed. For example, the number of image pixels may be increased, with the details of the development process being the same as those of the simplified development unit 111. Alternatively, the number of image pixels may be reduced in the same manner, while increasing the quality of the development process.

The high quality development unit 112 applies the so-called development process, including, for example, debayering (demosaicing) a RAW image to convert the image into signals composed of a luminance and a color difference, removing noise contained in each signal, correcting optical distortion, and perform image optimization. The number of pixels of a developed image generated by the high quality development unit 112 remains the same as the number of pixels read out from the image sensor unit 102, or is a number of pixels set by the user. Accordingly, the number of pixels of the image data from the high quality development unit 112 is larger than that of the image data output from the simplified development unit 111.

While the high quality development unit 112 can provide a developed image having higher image quality because it performs various types of processing with higher precision than the simplified development unit 111, the processing load thereof is large. The high quality development unit 112 of the present embodiment avoids using a circuit that requires large power consumption and a high cost by not applying a real-time development process in parallel with capturing.

The image data developed by the high quality development unit 112 is supplied to the still image compression unit 141, and the still image compression unit 141 performs high-efficiency encoding processing (still image compression) on the obtained image data (S1025), thus generating high-quality still image data.

At S1026, the recording and reproducing unit 151 records a still image file containing the high-quality still image data in the recording medium 152.

S1027 is processing of determining whether the imaging apparatus 100 is no longer in the idle state, and may be, for example, processing of determining whether a predefined event that causes the imaging apparatus 100 to exit from the idle state is generated. The event may be, for example, input of a capturing preparation instruction or capturing start instruction, input of an instruction to execute reproduction processing, a CPU operating ratio exceeding the threshold, and the like. Note that the generation of these events is not performed at the timing indicated by S1027 in fact, but is monitored in the background by the control unit 161 during the idle process. Whether the operation being performed is to be stopped or aborted upon detection of the generation of an event, or to be continued until the recording of a still image ends may be predefined. For example, the determination as to whether to continue, or stop or abort the processing may vary depending on which of the processing at S1022 to S1026 is being executed. Alternatively, the determination may vary depending on the event that is generated. For example, the processing may transition immediately to capturing processing when an event for which a time lag raises a problem, such as a capturing start instruction, is generated, and the processing may transition to reproduction processing after the recording of a still image ends when an event that is less urgent, such as an instruction to start reproduction, is generated.

In the case of stopping the processing, the control unit 161 performs stoppage processing of storing the necessary information such that the stopped processing can be resumed when the imaging apparatus 100 next enters in the idle state (S1028). The stoppage processing includes, for example, storing of data for which the process has not been completed and storing of information indicating how far the process is completed. On the other hand, in the case of aborting the processing, the unprocessed RAW file may be processed in the next processing, and therefore, it is not necessary to perform the stoppage processing.

When the imaging apparatus 100 is no longer in the idle state, the control unit 161 transitions to the processing in accordance with the operating mode that was performed before the idle process has been performed and the event. For example, if a capturing instruction is input when the processing has transitioned from the still image capturing mode to the idle process, the control unit 161 causes the processing in the still image capturing mode to be resumed from the processing at S502.

After the recording process has ended at S1026, if the idle state is continued, the processing is returned to S1020. If there is any remaining RAW image data to which the post development process has not been applied, the above-described processing is repeatedly performed.

Note that the high-quality still image file recorded at S1026 is recorded under the same file name as the simplified still image file recorded concurrently with the RAW file. This can be achieved by storing the still image file name contained in the metadata portion of the read out RAW file in the recording and reproducing unit 151. In the case of using the RAW image data remaining in the buffer unit 115, the metadata of the corresponding RAW file recorded in the recording medium 152 may be referred to. Alternatively, the recording and reproducing unit 151 may notify the file name to the control unit 161 when recording the simplified still image file, and the control unit 161 may store the file name in association with the RAW image data in the buffer unit 115. With such a file name, the simplified still image file in the recording medium 152 can be replaced with the high-quality still image file.

When recording the high-quality still image file, the recording and reproducing unit 151 updates the development status in the metadata in the corresponding RAW file with information indicating that the high quality development has been performed thereon (or that the post development has been performed thereon).

Thus, the imaging apparatus 100 of the present embodiment performs the post development in a user operation waiting state in which the processing load of the apparatus is relatively small, including, for example, during intervals between captures, in the reproduction mode, and in the sleep state. Then, the still image file obtained by the simplified development during capturing is replaced with the still image file obtained by the high quality development using the RAW file. Consequently, even if a high-quality image is required, for example, for display for checking the details or print out, it is not necessary to execute the development process each time such an occasion arises, and the high-quality image can be utilized in the same general environment as with a conventional still image file.

Note that a moving image file obtained by the simplified development during capturing is also subjected to the post development process in the same manner, and is replaced with a moving image file obtained by the high quality development (S930 in FIG. 5, S1220 in FIG. 9). Since each frame of the RAW moving image data is constituted by RAW image data, the frame can be developed in the same manner as the still image file. Then, by encoding the developed frame image in accordance with the encoding scheme of the moving image, a high-quality moving image file is successively generated. Note that in order to increase the efficiency of encoding processing, the unprocessed RAW file can be read out from the recording medium 152 in units of the number of frames (e.g., the number of frames constituting GOP) in accordance with the encoding scheme of the moving image.

In the case of stopping the post development process for the moving image file, for example, when the moving image compression unit 142 performs encoding in units of a predetermined number of frames in the stoppage processing at S1028, the moving image compression unit 142 waits until a high-quality moving image file is written in the recording medium 152 for each encoding unit. Then, at the time of writing the high-quality moving image file (overwriting the simplified moving image file), the recording and reproducing unit 151 stores the file name of the RAW moving image data being subjected to the post development process and information indicating that the number of frames for which the process has ended. Then, when the imaging apparatus 100 has next entered in the idle state, the post development process is resumed using this information. During the post development process of a moving image, each time a high-quality moving image file is written for each encoding unit, the file may be closed, and the management information of the recording medium 152 may be updated. Alternatively, processing of ending writing of these files may be performed during stoppage. While the former is more complicated processing, it requires less time for the processing to transition from the post development process to another process and can reduce the possibility of a damaged file and the like. Note that the post development process of a moving image is the same as the post development process of a still image in that the process may be immediately aborted depending on the event, but is different even in this case in that the currently processed moving image file in the recording medium 152 is closed.

Figure 11A:
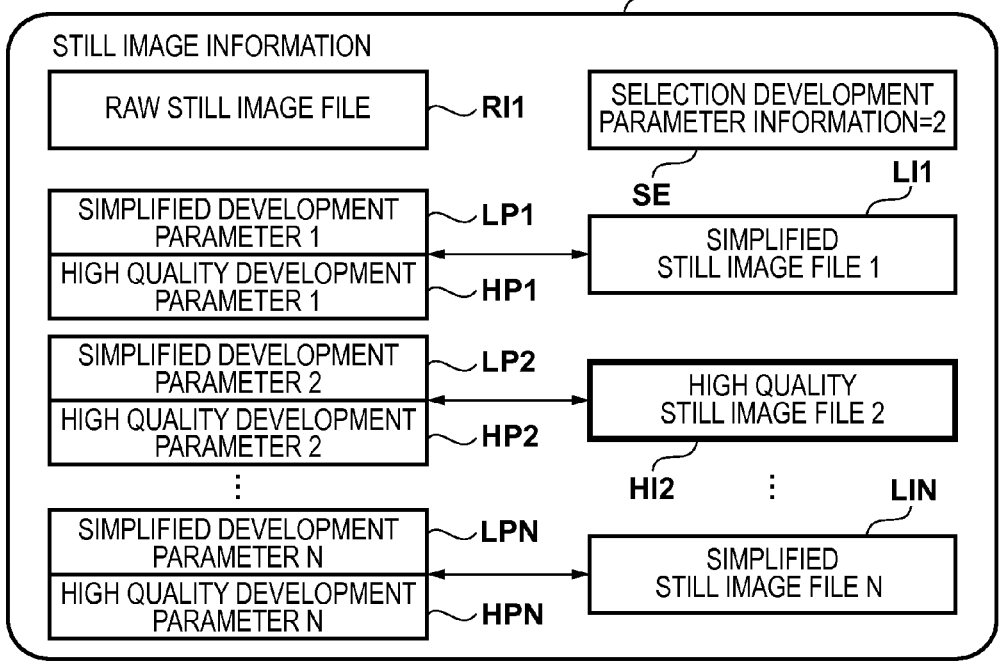
FIGS. 11A and 11B are diagrams showing examples of information after a post development process of the imaging apparatus according to an embodiment.
Figure 11B:
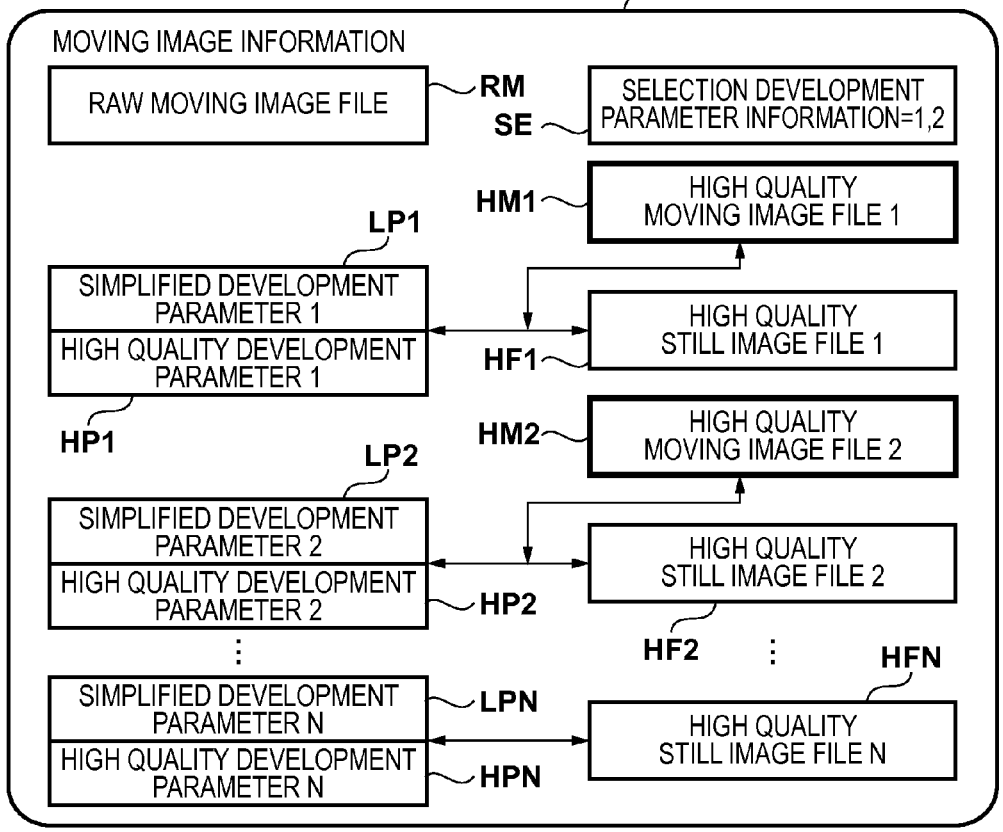

FIGS. 11A and 11B are diagrams showing states after the post development for the information recorded in the recording medium 152. FIG. 11A shows an example of the state after the post development for a still image file, and FIG. 11B shows the state after the post development for a moving image file, and FIGS. 11A and 11B correspond to FIG. 4 and FIG. 6, respectively.

In the still image file, from among the simplified still image files LIN, the one corresponding to the development parameters identified by the selection development parameter information SE is replaced by the post development. In FIG. 11A, as an example, the development parameter identified by the selection development parameter information SE is "2", and therefore, the simplified still image file LI2 is replaced with the high quality still image file HI2 generated by the post development using the high quality development parameter HP2. As with the simplified still image file LIN, the high quality still image file HIN generated by the post development is recorded in association with the corresponding simplified development parameter LPN and high quality development parameter HPN. Accordingly, the development parameter used for the development can be easily identified from the high quality still image file HIN.

In the moving image file, the simplified moving image file LMN is replaced by the post development. As an example, FIG. 11B shows a case where there are two development parameters, namely, "1" and "2", identified by the selection development parameter information SE. In this case, a simplified moving image file LM1 is replaced with a high quality moving image file HM1 generated by the post development, and a high quality moving image file HM2 is newly generated and recorded. The high quality moving image file HMN is recorded in association with the corresponding development parameters LPN and LPH.

As described thus far, according to the present embodiment, during capturing, an image obtained by applying the simplified development process to a RAW image is recorded together with the RAW image. Thereafter, the post development process is applied in which a development process that can provide an image having higher quality than that obtained by the simplified development process is applied to the recorded RAW image to generate a high-quality image, and the image obtained by the simplified development process is replaced with the high-quality image. This configuration makes it possible to achieve rapid continuous shooting or the like without a circuit that applies a development process at high speed, and also to easily check the content of the RAW image, for example, when the content is to be checked from another apparatus.

In addition, by automatically applying the post development process when the load of the imaging apparatus is low, a high-quality image can be obtained without the user being aware of the post development process. Accordingly, at the time of reproduction, a high-quality image can be immediately reproduced without the trouble of performing the post development process.

Furthermore, since the information indicating the state of progress of the post development process is presented, it is possible to select a moving image to be reproduced and to instruct execution of the high quality development process according to the state of progress, thus improving the user's convenience.

Furthermore, according to the present embodiment, during capturing, a plurality of pieces of still image data generated by applying different development parameters to RAW image data are recorded in association with the applied development parameters and the RAW image data. Then, the user is caused to select, from among the pieces of still image data recorded in association with the RAW image data, the still image data that represents the desired development result, and the development parameter corresponding to the selected still image data is set as the development parameter used during reproduction and the post development process. Accordingly, even a user without the knowledge for adjusting development parameters can easily set an appropriate development parameter for obtaining the desired development result.

Other Embodiments

Although the present embodiment has described a configuration in which the development parameters are generated during capturing, the generation of the development parameters may be performed after capturing. By generating the development parameters after capturing, the generation of still image data for comparing results of the development process obtained by using various development parameters is also performed after capturing, and therefore, the processing load during image capturing can be reduced. On the other hand, immediately after capturing, it is not possible to compare the results of the development process that vary from one development parameter to another, and to perform bracket capturing, and therefore, the types of developed still images that can be generated are restricted.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-55619, filed on Mar. 18, 2014, which is hereby incorporated by reference herein in its entirety.

What is claimed is:

1. An imaging apparatus comprising:
   an imaging unit configured to generate RAW image data representing an undeveloped image which is captured by an image sensor in response to a capturing instruction;
   a development unit configured to generate image data by applying, to the RAW image data, a first development process or a second development process that can provide an image having higher image quality than that obtained by the first development process;
   a recording unit configured to read and write data from and to a recording medium; and
   a control unit configured to control the recording unit so as to write, to the recording medium, the RAW image data and first image data obtained by applying the first development process to said RAW image data, and thereafter control the development unit and the recording unit so as to generate second image data by applying the second development process to the RAW image data written to the recording medium and write the second image data to the recording medium,
   wherein the control unit is further configured to: control the development unit so as to generate a plurality of pieces of third image data from the RAW image data by using a plurality of different development parameters; and decide, from among the plurality of pieces of third image data, a development parameter corresponding to image data selected by a user as a development parameter used in a development process for the RAW image data that is applied after the RAW image data has been written to the recording medium.

2. The imaging apparatus according to claim 1, wherein the development process for the RAW image data that is applied after the RAW image data has been written to the recording medium is the second development process for generating the second image data.

3. The imaging apparatus according to claim 1, wherein the development process for the RAW image data that is applied after the RAW image data has been written to the recording medium is the second development process for reproducing the RAW image data.

4. The imaging apparatus according to claim 1, wherein the control unit causes the development unit to generate the plurality of pieces of third image data by applying the first development process to the RAW image data when the RAW image data is still image data, and causes the development unit to generate the plurality of pieces of third image data by applying the second development process to the RAW image data when the RAW image data is moving image data.

5. The imaging apparatus according to claim 1, wherein the control unit controls the second development unit so as to generate the plurality of pieces of third image data from a representative frame image of the RAW image data when the RAW image data is moving image data.

6. The imaging apparatus according to claim 1, further comprising:
   a display unit configured to selectably display the plurality of pieces of third image data; and an input unit configured to receive selection for the displayed plurality of pieces of third image data.

7. The imaging apparatus according to claim 1, wherein the first development process has a lower processing load than the second development process.

8. The imaging apparatus according to claim 1, wherein image data obtained by the first development process has a fewer number of pixels than image data obtained by the second development process.

9. The imaging apparatus according to claim 1, wherein the first development process has at least one of a fewer number of steps and a lower precision than the second development process.

10. A non-transitory computer-readable recording medium having stored therein a program for causing a computer to function as the units according to claim 1, the computer being included in an imaging apparatus including a capturing unit configured to capture a subject image in response to a capturing instruction.

11. A control method of an imaging apparatus including:
   an imaging unit configured to generate RAW image data representing an undeveloped image which is captured by an image sensor in response to a capturing instruction;
   a development unit configured to generate image data by applying, to the RAW image data, a first development process or a second development process that can provide an image having higher image quality than that obtained by the first development process; and
   a recording unit configured to read and write data from and to a recording medium, the method comprising the steps of:
   controlling the recording unit so as to write, to the recording medium, the RAW image data and first image data obtained by applying the first development process to said RAW image data;
   controlling the development unit and the recording unit so as to generate second image data by applying the second development process to the RAW image data written to the recording medium and write the second image data to the recording medium;
   controlling the development unit so as to generate a plurality of pieces of third image data from the RAW image data by using a plurality of different development parameters; and
   deciding, from among the plurality of pieces of third image data, a development parameter corresponding to image data selected by a user as a development parameter used in a development process for the RAW image data that is applied after the RAW image data has been written to the recording medium.

* * * * *